(12) United States Patent
Sire et al.

(10) Patent No.: US 7,604,669 B2
(45) Date of Patent: Oct. 20, 2009

(54) MIXTURES OF REACTIVE DYES AND THEIR USE IN A METHOD FOR TRICHROMATIC DYEING OR PRINTING

(75) Inventors: Jean-Marie Sire, Hegenheim (FR);
Athanassios Tzikas, Pratteln (CH);
Georg Roentgen, Freiburg (DE)

(73) Assignee: Huntsman International LLC, The Woodlands, TX (US)

( * ) Notice: Subject to any disclaimer, the term of this patent is extended or adjusted under 35 U.S.C. 154(b) by 0 days.

(21) Appl. No.: 12/094,429

(22) PCT Filed: Nov. 6, 2006

(86) PCT No.: PCT/EP2006/068123

§ 371 (c)(1),
(2), (4) Date: May 21, 2008

(87) PCT Pub. No.: WO2007/062958

PCT Pub. Date: Jun. 7, 2007

(65) Prior Publication Data
US 2008/0256726 A1   Oct. 23, 2008

(30) Foreign Application Priority Data
Nov. 29, 2005   (EP)  ................................. 05111415

(51) Int. Cl.
*C09B 62/00* (2006.01)
(52) U.S. Cl. ...................... 8/549; 8/543; 8/641; 8/685; 8/918; 534/617; 534/618; 534/619
(58) Field of Classification Search .................. 8/549, 8/543, 641, 685, 918; 534/617, 618, 619
See application file for complete search history.

(56) References Cited

U.S. PATENT DOCUMENTS

| | | | |
|---|---|---|---|
| 4,772,687 A | 9/1988 | Henk | |
| 5,110,356 A | 5/1992 | Shirota et al. | |
| 6,630,005 B1 * | 10/2003 | Tzikas et al. | 8/549 |
| 6,852,135 B2 * | 2/2005 | Steckelberg et al. | 8/549 |
| 2002/0032318 A1 | 3/2002 | Tzikas et al. | |

FOREIGN PATENT DOCUMENTS

| | | |
|---|---|---|
| DE | 10035805 | 2/2002 |
| EP | 0201026 | 11/1986 |
| EP | 0381228 | 8/1990 |
| EP | 0458743 | 11/1991 |

OTHER PUBLICATIONS

STIC Search Report dated May 5, 2009.*
*Diazo Acid Dyes with 3-Amino-4-Methoxy Acetanilide and 1-Naphthylamine Components*, N. Sekar, et al., Colourage, vol. 52, No. 2, 2005, pp. 119-132.

* cited by examiner

*Primary Examiner*—Eisa B Elhilo

(57) ABSTRACT

Dye mixtures, comprising at least one dye of formula

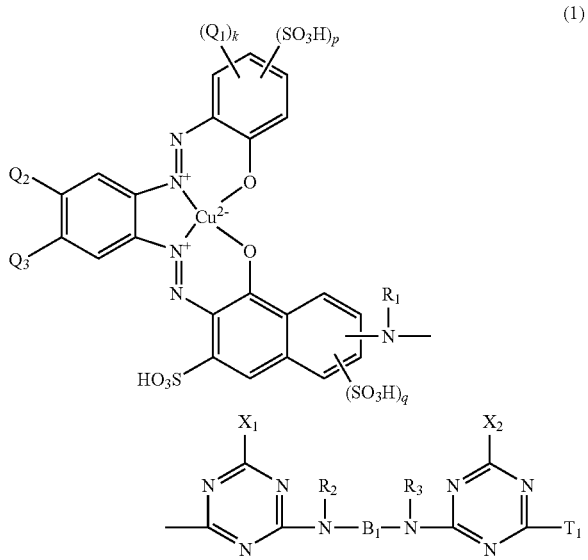

and at least one dye from the group of formulae

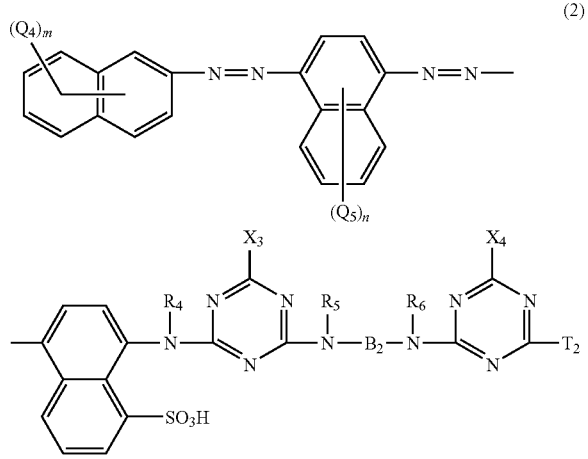

and

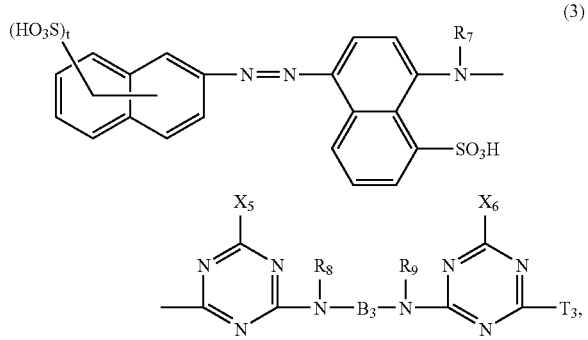

wherein $B_1$, $B_2$ and $B_3$ are each independently of the others an organic bridging member, $Q_1$ is $C_1$-$C_4$alkyl, halogen or a radical —$SO_2$-Z, $Q_2$ and $Q_3$ are each independently of the other $C_1$-$C_4$alkoxy, $Q_4$ is $C_1$-$C_4$alkoxy, $C_1$-$C_4$alkyl, halogen or sulfo $Q_5$ is $C_1$-$C_4$alkoxy, $C_1$-$C_4$alkyl, $C_1$-$C_4$alkanoylamino, ureido, halogen or sulfo, $R_1$, $R_2$, $R_3$, $R_4$, $R_5$, $R_6$, $R_7$, $R_8$ and $R_9$ are each independently of the others hydrogen or unsubstituted or substituted $C_1$-$C_4$alkyl, k and q are each independently of the other the number 0 or 1, n and p are each independently of the other the number 0, 1 or 2, m is the number 0, 1, 2 or 3, t is the number 1, 2 or 3, $X_1$, $X_2$, $X_3$, $X_4$, $X_5$ and $X_6$ are each independently of the others halogen, and $T_1$, $T_2$ and $T_3$ are each independently of the others a non-fiber-reactive substituent or a fiber-reactive radical of formula

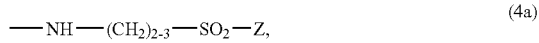  (4a)

  (4b)

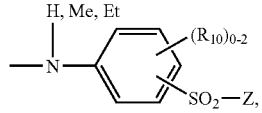  (4c)

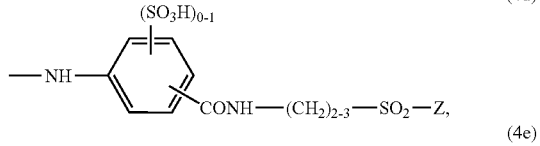  (4d)

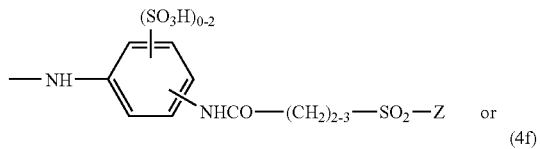  (4e)

or

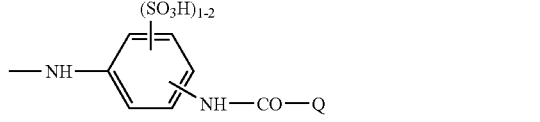  (4f)

wherein $(R_{10})_{0-2}$ denotes from 0 to 2 identical or different substituents from the group halogen, $C_1$-$C_4$alkyl, $C_1$-$C_4$alkoxy and sulfo, Z is vinyl or a radical —$CH_2$—$CH_2$—U and U is a group removable under alkaline conditions, Q is a group —CH(Hal)-$CH_2$-Hal or —C(Hal)=$CH_2$, and Hal is halogen, are suitable especially for the dichromatic or trichromatic dyeing or printing of cellulosic fiber materials and yield dyeings or prints having good reproducibility and good all-round fastness properties.

14 Claims, No Drawings

MIXTURES OF REACTIVE DYES AND THEIR USE IN A METHOD FOR TRICHROMATIC DYEING OR PRINTING

CROSS REFERENCE TO RELATED APPLICATIONS

This application is the National Phase of International Application PCT/EP2006/068123 filed Nov. 6, 2006 which designated the U.S. and which claims priority to European Patent Application (EP) 05111415.5 filed Nov. 29, 2005. The noted applications are incorporated herein by reference.

The present invention relates to mixtures of reactive dyes that are suitable for the dyeing or printing of nitrogen-containing or hydroxy-group-containing fibre materials and yield on such materials dyeings or prints having good reproducibility and good all-round fastness properties. The present invention relates also to a method for dichromatic or trichromatic dyeing or printing wherein the reactive dye mixtures according to the invention are used.

Over the past few years, the taste in fashion has moved towards more restrained colours. The trend is for muted, autumnal colours with, for example, a large amount of brown, grey, olive, beige, khaki, sandy shades, dull yellow shades and aubergine. As a result, about 30 to 40% of the dyed or printed textiles currently produced are in muted colour shades.

Muted colour shades on cellulose are usually produced using vat dyes. Vat-dyed textile materials have good fastness properties, for example wet-fastness properties, but dyeing with vat dyes is expensive in terms of equipment. Vat dyeing is carried out in so-called continuous dyeing machines which are not universally available. Furthermore, dyeing on continuous machines is economical only for high meterages.

Dyed or printed textile materials having good wet-fastness properties can be obtained, for example, using reactive dyes that are covalently bonded to the textile fibre. Dyeing with reactive dyes can be carried out in accordance with, for example, the exhaust method or the pad-dyeing method. Those methods are less expensive in terms of equipment than dyeing on a continuous machine, and suitable apparatus is usually available in the dyeing works. Moreover, relatively low meterages can still be dyed economically in that way.

A disadvantage in the production of dyed or printed textiles in muted colour shades, however, is their poor reproducibility using the trichromatic principle in which the shade is obtained using mixtures of yellow- or orange-dyeing reactive dyes together with red- and blue-dyeing reactive dyes.

The present invention is therefore based on the problem of providing new mixtures of reactive dyes that are suitable especially for the reproducible, dichromatic and trichromatic dyeing and printing of fibre materials in muted colour shades. The dye mixtures according to the invention should also yield dyeings or prints having good all-round fastness properties, for example light fastness and wet fastness.

The present invention accordingly relates to dye mixtures comprising at least one dye, for example one, two or three dyes, preferably one dye of formula

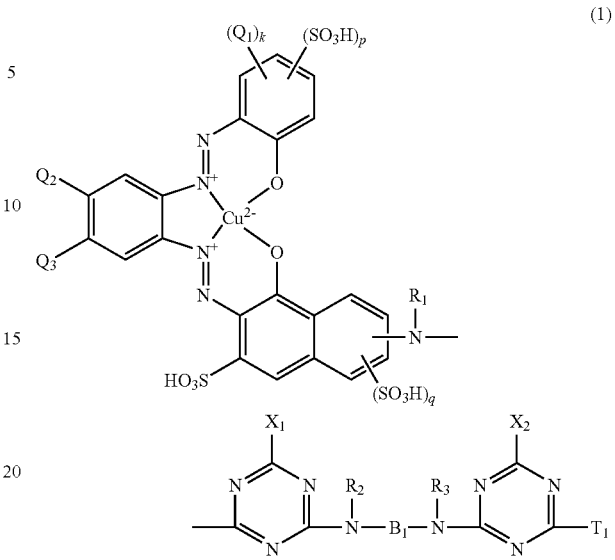

and at least one dye, for example one, two or three dyes, from the group of formulae

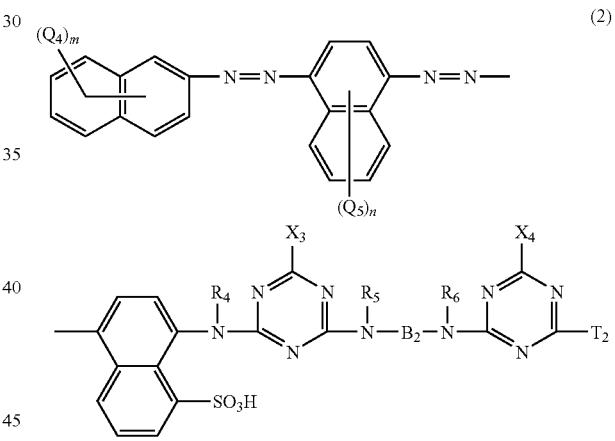

and

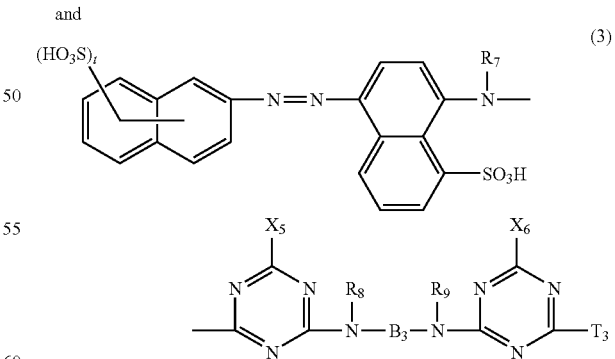

wherein
$B_1$, $B_2$ and $B_3$ are each independently of the others an organic bridging member,
$Q_1$ is $C_1$-$C_4$alkyl, halogen or a radical —$SO_2$-Z,
$Q_2$ and $Q_3$ are each independently of the other $C_1$-$C_4$alkoxy.

$Q_4$ is $C_1$-$C_4$alkoxy, $C_1$-$C_4$alkyl, halogen or sulfo, $Q_5$ is $C_1$-$C_4$alkoxy, $C_1$-$C_4$alkyl, $C_1$-$C_4$alkanoylamino, ureido, halogen or sulfo, $R_1$, $R_2$, $R_3$, $R_4$, $R_5$, $R_6$, $R_7$, $R_8$ and $R_9$ are each independently of the others hydrogen or unsubstituted or substituted $C_1$-$C_4$alkyl, k and q are each independently of the other the number 0 or 1, n and p are each independently of the other the number 0, 1 or 2, m is the number 0, 1, 2 or 3, t is the number 1, 2 or 3, $X_1$, $X_2$, $X_3$, $X_4$, $X_5$ and $X_6$ are each independently of the others halogen, and $T_1$, $T_2$ and $T_3$ are each independently of the others a non-fibre-reactive substituent or a fibre-reactive radical of formula

 (4a)

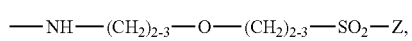 (4b)

 (4c)

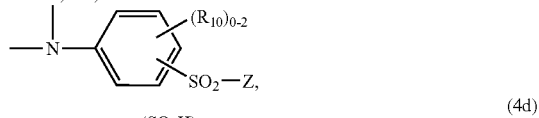 (4d)

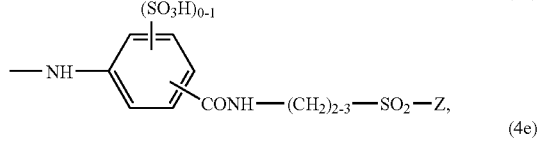 (4e)

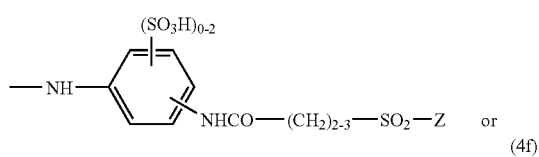 (4f)

wherein $(R_{10})_{0-2}$ denotes from 0 to 2 identical or different substituents from the group halogen, $C_1$-$C_4$alkyl, $C_1$-$C_4$alkoxy and sulfo, Z is vinyl or a radical —$CH_2$—$CH_2$—U and U is a group removable under alkaline conditions, Q is a group —CH(Hal)-$CH_2$-Hal or —C(Hal)=$CH_2$, and Hal is halogen.

Preferably, the dye mixtures according to the invention comprise at least one dye of formula (1), at least one dye of formula (2) and at least one dye of formula (3).

In the radical of formula (4c), Me is the methyl radical and Et is the ethyl radical. The said radicals come into consideration, in addition to hydrogen, as substituents at the nitrogen atom.

The terminal diazo component and the middle coupling component in the dye of formula (2) are each independently of the other either a benzene radical or a naphthalene radical, which is indicated by the broken lines. When the terminal diazo component is a naphthalene radical, the middle coupling component is preferably a benzene radical. When the terminal diazo component is a benzene radical, the middle coupling component is preferably a naphthalene radical.

As $C_1$-$C_4$alkyl there come into consideration for $Q_1$, $Q_4$, $Q_5$ and $R_{10}$ each independently of the others e.g. methyl, ethyl, propyl, isopropyl, n-butyl, sec-butyl, tert-butyl and isobutyl, preferably methyl and ethyl and especially methyl.

The radicals $R_1$, $R_2$, $R_3$, $R_4$, $R_5$, $R_6$, $R_7$, $R_8$ and $R_9$ as alkyl radicals are straight-chain or branched. The alkyl radicals may themselves be substituted, for example by hydroxy, sulfo, sulfato, cyano or by carboxy. Examples that may be mentioned are methyl, ethyl, n-propyl, isopropyl, n-butyl, sec-butyl, tert-butyl and isobutyl as well as the corresponding radicals substituted by hydroxy, sulfo, sulfato, cyano or by carboxy. Preferred as substituents are hydroxy, sulfo and sulfato, especially hydroxy and sulfato and more especially hydroxy.

As $C_1$-$C_4$alkoxy there come into consideration for $Q_2$, $Q_3$, $Q_4$, $Q_5$ and $R_{10}$ each independently of the others e.g. methoxy, ethoxy, n-propoxy, isopropoxy, n-butoxy and isobutoxy, preferably methoxy and ethoxy and especially methoxy.

As halogen there come into consideration for $Q_1$, $Q_4$, $Q_5$ and $R_{10}$ each independently of the others e.g. fluorine, chlorine and bromine, preferably chlorine.

As $C_1$-$C_4$alkanoylamino there comes into consideration for $Q_5$ e.g. acetylamino, propionylamino or butyrylamino, preferably acetylamino.

Preferably, $Q_1$ is methyl, chlorine or a radical —$SO_2$-Z, especially a radical —$SO_2$-Z wherein Z is as defined above.

Preferably, $Q_2$ and $Q_3$ are methoxy.

Preferably, $Q_4$ is $C_1$-$C_4$alkoxy, $C_1$-$C_4$alkyl or sulfo, especially sulfo.

Preferably, $Q_5$ is $C_1$-$C_4$alkoxy, $C_1$-$C_4$alkyl, $C_1$-$C_4$alkanoylamino or sulfo. When the middle coupling component is a naphthalene radical, $Q_5$ is especially sulfo. When the middle coupling component is a benzene radical, $Q_5$ is especially $C_1$-$C_4$alkoxy, $C_1$-$C_4$alkyl or $C_1$-$C_4$alkanoylamino.

Preferably, $R_1$, $R_4$ and $R_7$ are each independently of the others hydrogen or $C_1$-$C_4$alkyl, especially hydrogen.

$R_2$, $R_3$, $R_5$, $R_6$, $R_8$ and $R_9$ are preferably each independently of the others hydrogen or $C_1$-$C_4$alkyl unsubstituted or substituted by hydroxy, sulfo, sulfato, cyano or by carboxy. In accordance with an embodiment of interest, one of the radicals $R_2$ and $R_3$ or $R_5$ and $R_6$ or $R_8$ and $R_9$ is $C_1$-$C_4$alkyl substituted by hydroxy, sulfo, sulfato cyano or by carboxy, and the other of the respective radicals $R_2$ and $R_3$ or $R_5$ and $R_6$ or $R_8$ and $R_9$ is hydrogen or $C_1$-$C_4$alkyl, especially hydrogen.

More especially, $R_2$, $R_3$, $R_5$, $R_6$, $R_8$ and $R_9$ are each independently of the others hydrogen or $C_1$-$C_4$alkyl, especially hydrogen.

In an important embodiment of the present invention, $R_1$, $R_2$, $R_3$, $R_4$, $R_5$, $R_6$, $R_7$, $R_8$ and $R_9$ are hydrogen.

Preferably, $(R_{10})_{0-2}$ denotes from 0 to 2 identical or different substituents from the group $C_1$-$C_4$alkyl, $C_1$-$C_4$alkoxy and sulfo, especially methyl, methoxy and sulfo.

More especially, $R_{10}$ is hydrogen.

The organic bridging members $B_1$, $B_2$ and $B_3$, each independently of the others, may be e.g. an aliphatic, cycloaliphatic, aromatic or araliphatic bridging member.

As aliphatic bridging members, $B_1$, $B_2$ and $B_3$ are each independently of the others e.g. a straight-chain or branched $C_2$-$C_{12}$alkylene radical, especially a $C_2$-$C_6$alkylene radical, which may be interrupted by 1, 2 or 3 members from the group —NH—, —N($CH_3$)— and, especially, —O— and is unsubstituted or substituted by hydroxy, sulfo, sulfato, cyano or by carboxy. Preferred as substituents of the alkylene radicals mentioned for $B_1$, $B_2$ and $B_3$ are hydroxy, sulfo and sulfato, especially hydroxy and sulfato.

As aliphatic bridging members there also come into consideration for $B_1$, $B_2$ and $B_3$ each independently of the others e.g. $C_5$-$C_9$cycloalkylene radicals, especially cyclohexylene radicals. The said cycloalkylene radicals may be unsubstituted or substituted by $C_1$-$C_4$alkyl, $C_1$-$C_4$alkoxy, $C_2$-$C_4$alkanoylamino, sulfo, halogen or by carboxy, especially by $C_1$-$C_4$alkyl. There may also be mentioned as aliphatic bridging members for $B_1$, $B_2$ and $B_3$, each independently of the others, methylenecyclohexylene, ethylenecyclohexylene and methylenecyclohexylenemethylene radicals, each unsubstituted or substituted in the cyclohexylene ring by $C_1$-$C_4$alkyl, especially by methyl.

For the radicals of formulae

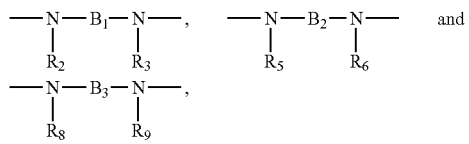

each independently of the others, there also comes into consideration e.g. a radical of formula

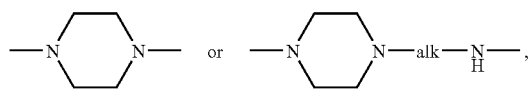

wherein alk is $C_1$-$C_4$alkylene, for example ethylene.

As aromatic bridging members, $B_1$, $B_2$ and $B_3$ are each independently of the others e.g. $C_1$-$C_6$alkylenephenylene, for example methylenphenylene, $C_1$-$C_4$alkylenephenylene-$C_1$-$C_4$alkylene, for example methylenephenylenemethylene, or phenylene, each unsubstituted or substituted by $C_1$-$C_4$alkyl, $C_1$-$C_4$alkoxy, $C_2$-$C_4$alkanoylamino, sulfo, halogen or by carboxy; or a radical of formula

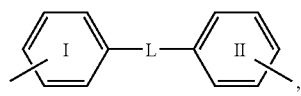

(5)

wherein the benzene rings I and II are unsubstituted or substituted by $C_1$-$C_4$alkyl, $C_1$-$C_4$-alkoxy, $C_2$-$C_4$alkanoylamino, sulfo, halogen or by carboxy and L is a direct bond or a $C_2$-$C_{10}$-alkylene radical which may be interrupted by 1, 2 or 3 oxygen atoms, or L is a bridging member of the formula —CH=CH—, —N=N—, —NH—, —CO—, —NH—CO—, —NH—SO$_2$—, —NH—CO—NH—, —O—, —S— or —SO$_2$—. As aromatic bridging members, $B_1$, $B_2$ and $B_3$ are each independently of the others preferably phenylene which may be substituted as indicated above. Preferably, the aromatic bridging members mentioned for $B_1$, $B_2$ and $B_3$ are each independently of the others unsubstituted or substituted by sulfo.

Examples of aromatic bridging members $B_1$, $B_2$ and $B_3$ are each independently of the others 1,3-phenylene, 1,4-phenylene, 4-methyl-1,3-phenylene, 4-sulfo-1,3-phenylene, 3-sulfo-1,4-phenylene, 3,6-disulfo-1,4-phenylene, 4,6-disulfo-1,3-phenylene, 3,7-disulfo-1,5-naphthylene, 4,8-disulfo-2,6-naphthylene, 2,2'-disulfo-4,4'-diphenylene, 4,4'-phenyleneurea-2,2'-disulfonic acid and 2,2'-disulfo-4,4'-stilbenylene.

Preferably, $B_1$, $B_2$ and $B_3$ are each independently of the others a $C_2$-$C_{12}$alkylene radical which may be interrupted by 1, 2 or 3 members from the group —NH—, —N(CH$_3$)— and —O— and is unsubstituted or substituted by hydroxy, sulfo, sulfato, cyano or by carboxy; a $C_5$-$C_9$cycloalkylene radical, $C_1$-$C_6$alkylenephenylene radical or phenylene radical, each unsubstituted or substituted by $C_1$-$C_4$alkyl, $C_1$-$C_4$alkoxy, $C_2$-$C_4$alkanoylamino, sulfo, halogen or by carboxy; or the radicals of formulae

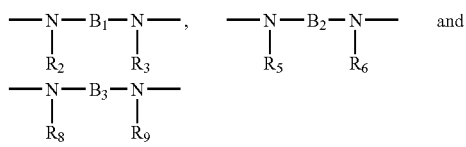

are a radical of formula

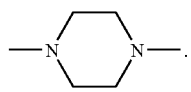

More especially, $B_1$, $B_2$ and $B_3$ are each independently of the others a $C_2$-$C_{12}$alkylene radical which may be interrupted by 1, 2 or 3 —O— members and is unsubstituted or substituted by hydroxy, sulfo, sulfato, cyano or by carboxy, or a phenylene radical unsubstituted or substituted by $C_1$-$C_4$alkyl, $C_1$-$C_4$alkoxy, $C_2$-$C_4$alkanoylamino, sulfo, halogen or by carboxy.

Very especially, $B_1$, $B_2$ and $B_3$ are each independently of the others a $C_2$-$C_{12}$alkylene radical, especially a $C_2$-$C_6$alkylene radical, for example 1,2-ethylene, 1,3-propylene, 1,2-propylene, 1,4-butylene, 1,3-butylene, 1,5-pentylene, 3,5-pentylene, 1,6-hexylene, 2,5-hexylene, 4,6-hexylene or a radical of formula

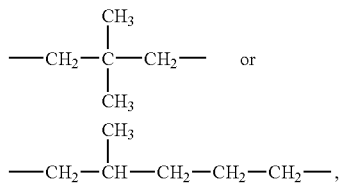

which may be interrupted by 1, 2 or 3 —O— members and is unsubstituted or substituted by hydroxy or by sulfato, but is preferably unsubstituted and not interrupted by —O—.

Especially important as bridging members $B_1$, $B_2$ and $B_3$ are those of formula —CH$_2$—CH(R$_{11}$)— wherein R$_{11}$ is $C_1$-$C_4$alkyl, especially methyl, and more especially 1,2-propylene.

As halogen there come into consideration for $X_1$, $X_2$, $X_3$, $X_4$, $X_5$ and $X_6$ each independently of the others e.g. fluorine, chlorine and bromine, preferably fluorine and chlorine.

More especially, $X_2$, $X_4$ and $X_6$ are fluorine.

More especially, $X_1$ is chlorine.

More especially, $X_3$ and $X_5$ are chlorine.

When $T_1$, $T_2$ and $T_3$ are each independently of the others a non-fibre-reactive substituent, that substituent may be, for example, hydroxy; $C_1$-$C_4$alkoxy; $C_1$-$C_4$alkylthio unsubstituted or substituted e.g. by hydroxy, carboxy or by sulfo; amino; amino mono- or di-substituted by $C_1$-$C_8$alkyl, wherein alkyl is unsubstituted or is itself substituted e.g. by sulfo, sulfato, hydroxy, carboxy or by phenyl, especially by sulfo or by hydroxy, and may be interrupted one or more times by the radical —O—; cyclohexylamino; morpholino; N—$C_1$-$C_4$alkyl-N-phenylamino or phenylamino or naphthylamino, wherein the phenyl or naphthyl are unsubstituted or substituted e.g. by $C_1$-$C_4$alkyl, $C_1$-$C_4$alkoxy, $C_1$-$C_4$alkanoylamino, carboxy, sulfo or by halogen and the alkyl is unsubstituted or substituted e.g. by hydroxy, sulfo or by sulfato.

Examples of suitable non-fibre-reactive substituents $T_1$, $T_2$ and $T_3$ are amino, methylamino, ethylamino, β-hydroxyethylamino, N-methyl-N-β-hydroxyethylamino, N-ethyl-N-β-hydroxyethylamino, N,N-di-β-hydroxyethylamino, β-sulfoethylamino, cyclohexylamino, morpholino, 2-, 3- or 4-chlorophenylamino, 2-, 3- or 4-methylphenylamino, 2-, 3- or 4-methoxyphenylamino, 2-, 3- or 4-sulfophenylamino, 2,5-disulfophenylamino, 2-, 3- or 4-carboxyphenylamino, 1- or 2-naphthylamino, 1-sulfo-2-naphthylamino, 4,8-disulfo-2-naphthylamino, N-ethyl-N-phenylamino, N-methyl-N-phenylamino, methoxy, ethoxy, n- or iso-propoxy and hydroxy.

As non-fibre-reactive substituents, $T_1$, $T_2$ and $T_3$ are each independently of the others preferably $C_1$-$C_4$alkoxy; $C_1$-$C_4$alkylthio unsubstituted or substituted by hydroxy, carboxy or by sulfo; hydroxy; amino; N-mono- or N,N-di-$C_1$-$C_4$alkylamino unsubstituted or substituted in the alkyl moiety by hydroxy, sulfato or by sulfo; morpholino; phenylamino unsubstituted or substituted on the phenyl ring by sulfo, carboxy, acetylamino, chlorine, methyl or by methoxy or N—$C_1$-$C_4$-alkyl-N-phenylamino unsubstituted or substituted in the same way wherein the alkyl is unsubstituted or substituted by hydroxy, sulfo or by sulfato; or naphthylamino unsubstituted or substituted by from 1 to 3 sulfo groups.

Especially preferred non-fibre-reactive substituents $T_1$, $T_2$ and $T_3$ are each independently of the others amino, N-methylamino, N-ethylamino, N-β-hydroxyethylamino, N-methyl-N-β-hydroxyethylamino, N-ethyl-N-β-hydroxyethylamino, N,N-di-β-hydroxyethylamino, β-sulfoethylamino, morpholino, 2-, 3- or 4-carboxyphenylamino, 2-, 3- or 4-sulfophenylamino, 2,5-disulfophenylamino or 4,8-disulfo-2-naphthylamino, especially 2-, 3- or 4-sulfophenylamino, 2,5-disulfophenylamino or 4,8-disulfo-2-naphthylamino.

Hal in the fibre-reactive radical of formula (4f is preferably chlorine or bromine, especially bromine.

As leaving group U there comes into consideration, for example, —Cl, —Br, —F, —OSO$_3$H, —SSO$_3$H, —OCO—CH$_3$, —OPO$_3$H$_2$, —OCO—C$_6$H$_5$, —OSO$_2$—C$_1$-$C_4$alkyl or —OSO$_2$—N(C$_1$-$C_4$alkyl)$_2$. U is preferably a group of the formula —Cl, —OSO$_3$H, —SSO$_3$H, —OCO—CH$_3$, —OCO—C$_6$H$_5$ or —OPO$_3$H$_2$, especially —Cl or —OSO$_3$H.

Examples of suitable radicals Z are accordingly vinyl, β-bromo- or β-chloro-ethyl, β-acetoxyethyl, β-benzoyloxyethyl, β-phosphatoethyl, β-sulfatoethyl and β-thiosulfatoethyl. Z is preferably vinyl, β-chloroethyl or β-sulfatoethyl and especially β-sulfatoethyl or vinyl.

When $T_1$, $T_2$ and $T_3$ are each a fibre-reactive radical, $T_1$, $T_2$ and $T_3$ are each independently of the others preferably a radical of formula (4c), (4d), (4e) or (4f), especially of formula (4c) or (4d) and more especially of formula (4c).

k is preferably the number 0.

When the terminal diazo component in the dye of formula (2) is a benzene radical, m is preferably the number 0, 1 or 2, especially the number 1 or 2. When the terminal diazo component in the dye of formula (2) is a naphthalene radical, m is preferably the number 1, 2 or 3, especially the number 2 or 3.

When the middle coupling component in the dye of formula (2) is a benzene radical, n is preferably the number 1 or 2, especially the number 2. When the middle coupling component in the dye of formula (2) is a naphthalene radical, n is preferably the number 1.

Preferably, p is the number 1 or 2, especially the number 1.
Preferably, q is the number 0.
Preferably, t is the number 2 or 3, especially the number 2.
The radical of formula (4c) is preferably a radical of formula

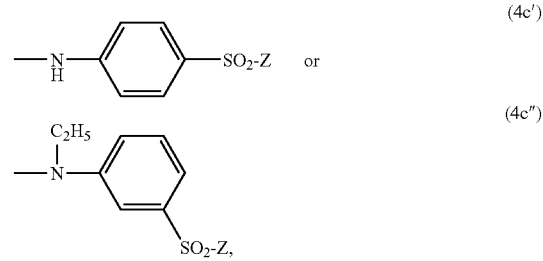

wherein Z has the meanings and preferred meanings defined above.

Preference is given to dye mixtures wherein the dye of formula (1) corresponds to a dye of formula

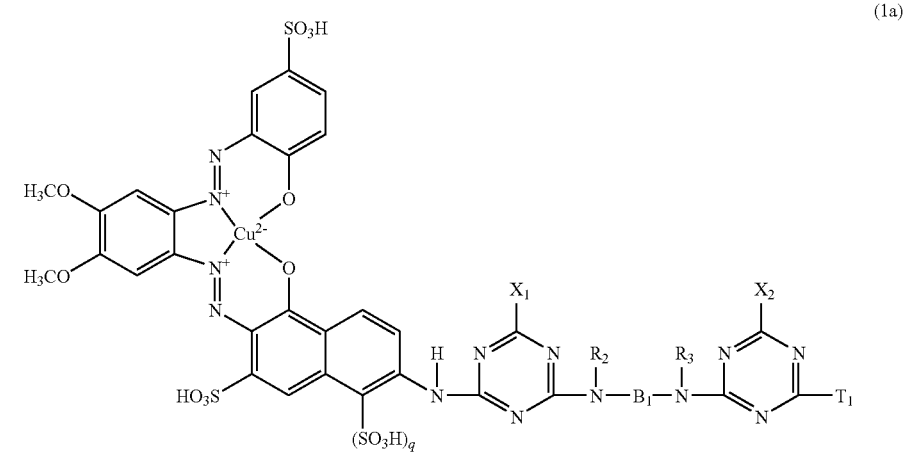

wherein
$B_1$, $X_1$, $X_2$, $R_2$, $R_3$, $T_1$ and q each have the meanings and preferred meanings defined above, and especially, $B_1$ is a $C_2$-$C_6$alkylene radical, $R_2$ and $R_3$ are hydrogen, $X_1$ is fluorine or chlorine, $X_2$ is fluorine, q is the number 0 or 1, and $T_1$ is amino, N-methylamino, N-ethylamino, N-β-hydroxyethylamino, N-methyl-N-β-hydroxyethylamino, N-ethyl-N-β-hydroxyethylamino, N,N-di-β-hydroxyethylamino, β-sulfoethylamino, morpholino, 2-, 3- or 4-carboxyphenylamino, 2-, 3- or 4-sulfophenylamino, 2,5-disulfophenylamino, 4,8-disulfo-2-naphthylamino or a fibre-reactive radical of the above-mentioned formula (4c).

Preference is also given to dye mixtures wherein the dye of formula (2) corresponds to a dye of formula wherein
$B_2$, $X_3$, $X_4$, $R_5$, $R_6$, $Q_4$, $T_2$ and m each have the meanings and preferred meanings defined above, and especially, $B_2$ is a $C_2$-$C_6$alkylene radical, $R_5$ and $R_6$ are hydrogen, $X_3$ is fluorine or chlorine, $X_4$ is fluorine, m is the number 1 or 2, $Q_4$ is $C_1$-$C_4$alkoxy, $C_1$-$C_4$alkyl or sulfo, especially methyl, methoxy or sulfo, and $T_2$ is a fibre-reactive radical of the above-mentioned formula (4c).

Also preferred are dye mixtures wherein the dye of formula (3) corresponds to a dye of formula

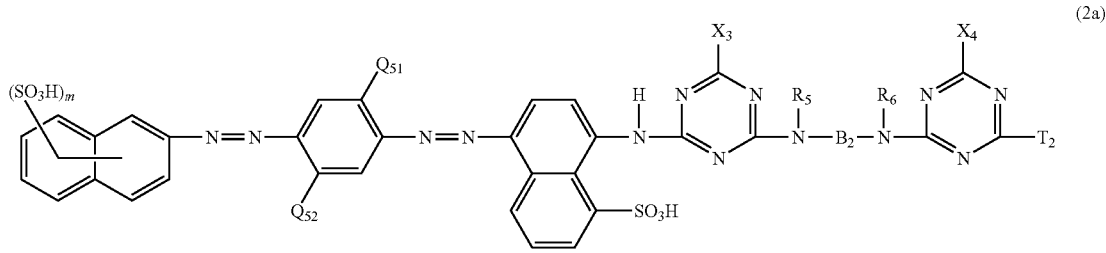

(2a)

wherein
$B_2$, $X_3$, $X_4$, $R_5$, $R_6$ and $T_2$ each have the meanings and preferred meanings defined above, and
m is the number 1, 2 or 3,
$Q_{51}$ is $C_1$-$C_4$alkoxy, $C_1$-$C_4$alkyl, halogen or sulfo, and
$Q_{52}$ is $C_1$-$C_4$alkoxy, $C_1$-$C_4$alkyl, $C_1$-$C_4$alkanoylamino or ureido; and
especially, $B_2$ is a $C_2$-$C_6$alkylene radical, $R_5$ and $R_6$ are hydrogen, $X_3$ is fluorine or chlorine, $X_4$ is fluorine, m is the number 2 or 3, $Q_{51}$ is $C_1$-$C_4$alkoxy or $C_1$-$C_4$alkyl, especially methoxy or methyl, $Q_{52}$ is $C_1$-$C_4$alkoxy, $C_1$-$C_4$alkyl or $C_1$-$C_4$alkanoylamino, especially methoxy, methyl or acetylamino, and $T_2$ is a fibre-reactive radical of the above-mentioned formula (4c).

In an interesting embodiment of the dye mixtures according to the invention, the dye of formula (2) is a dye of formula

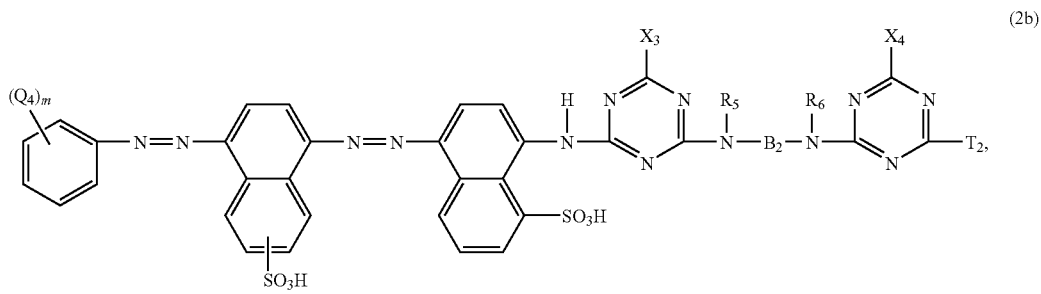

(2b)

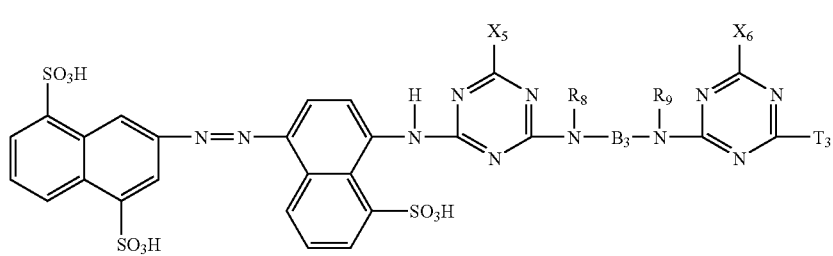
(3a)
wherein
$B_3$, $X_5$, $X_6$, $R_8$, $R_9$ and $T_3$ each have the meanings and preferred meanings defined above, and especially, $B_3$ is a $C_2$-$C_6$alkylene radical, $R_8$ and $R_9$ are hydrogen, $X_5$ is fluorine or chlorine, $X_6$ is fluorine, and $T_3$ is a fibre-reactive radical of the above-mentioned formula (4c). The dye of formula (1) is, for example, a dye of formula
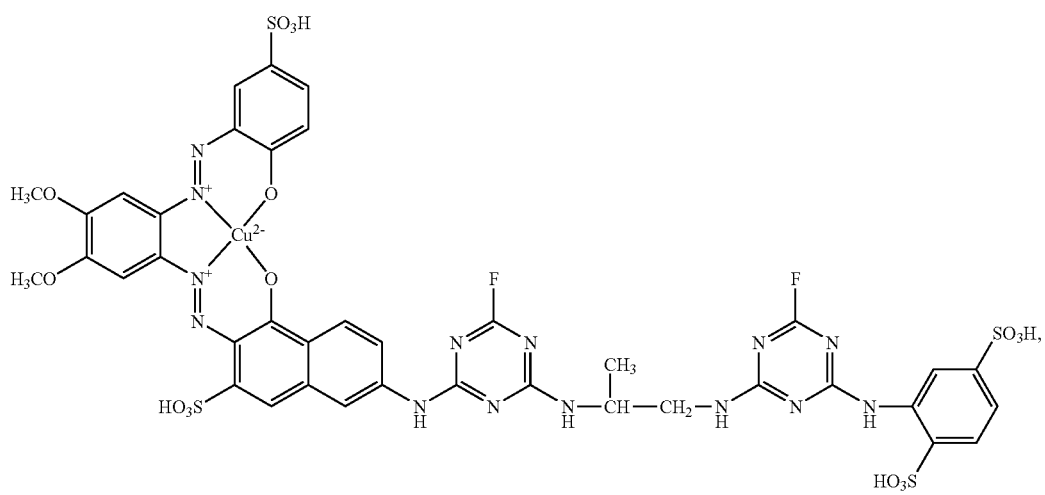
(101)
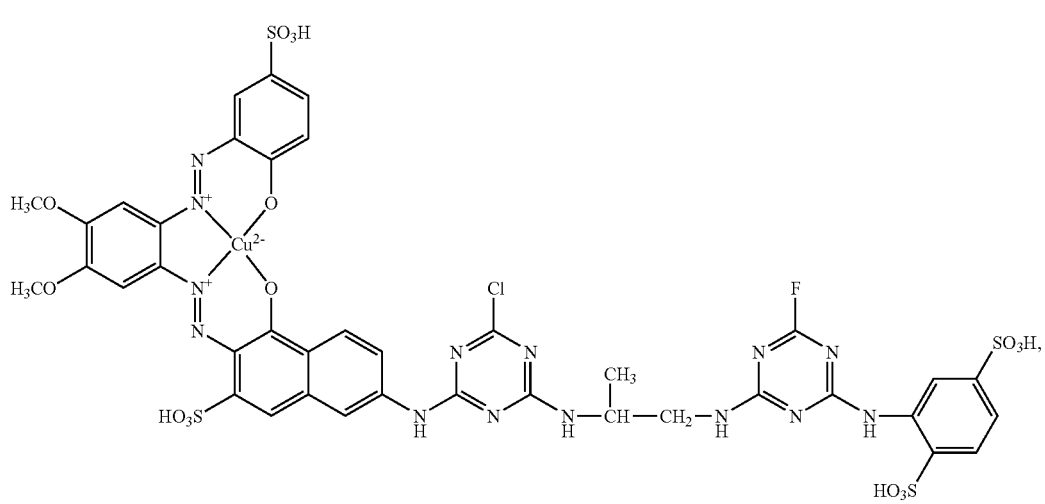
(102)

-continued
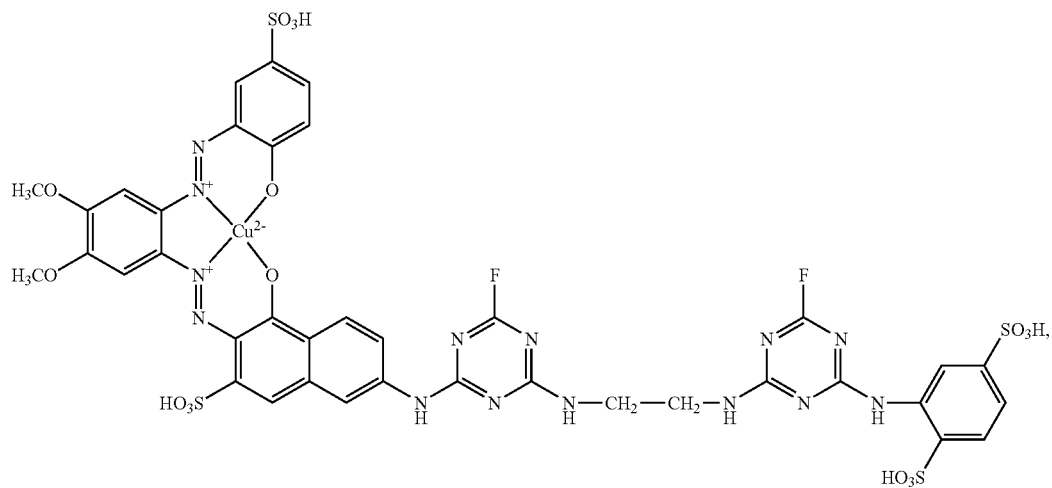
(103)
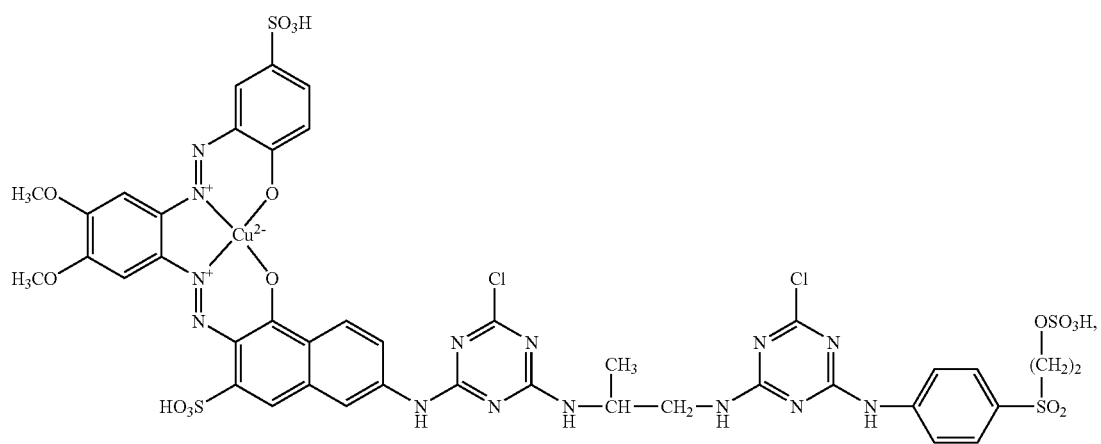
(104)
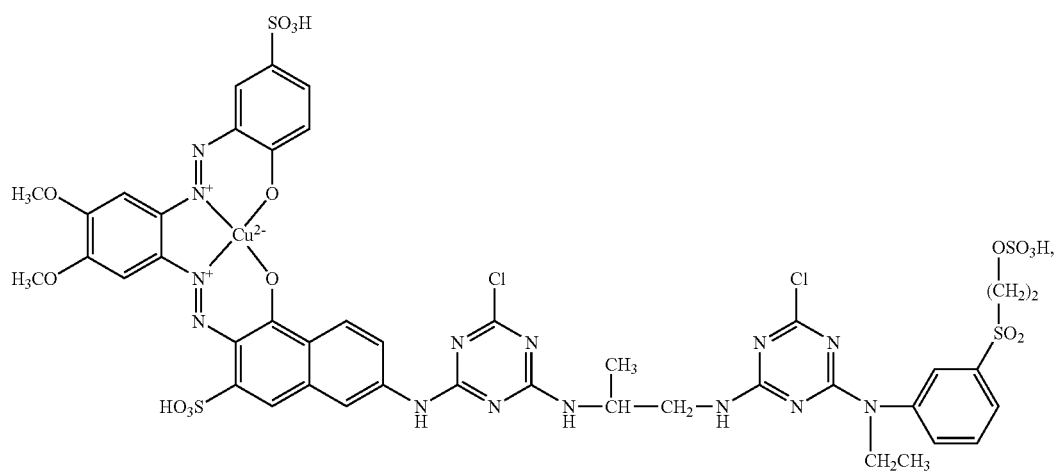
(105)

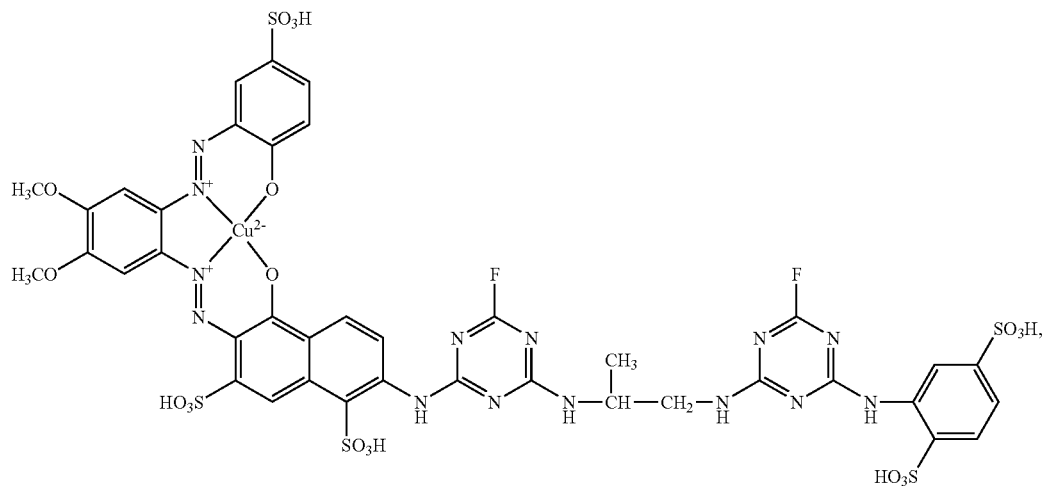
(106)
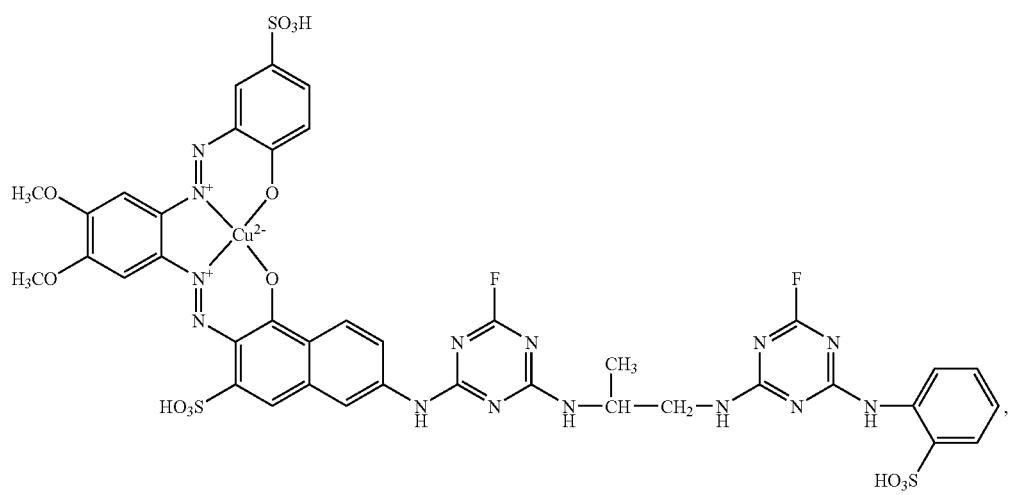
(107)
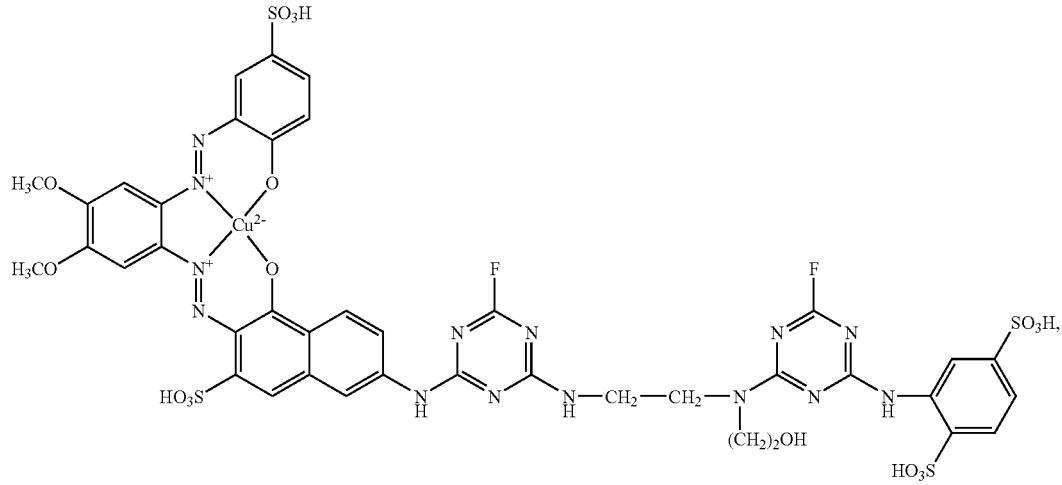
(108)
preferably a dye of formula (101) or (102).

The dye of formula (2) is, for example, a dye of formula
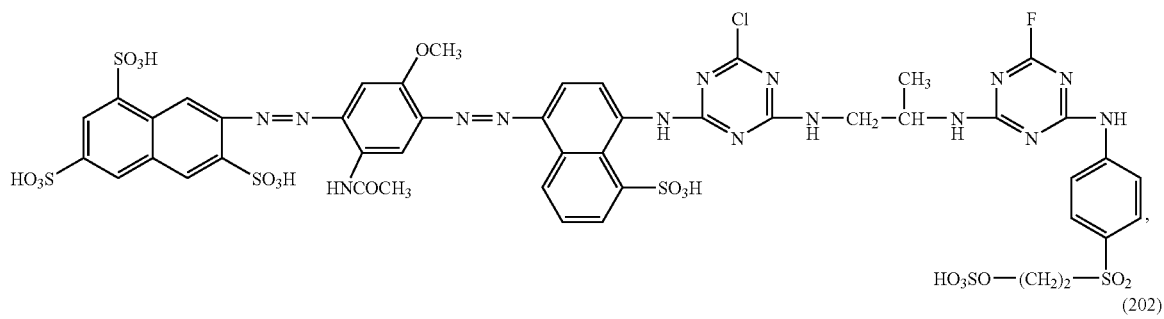
(201)
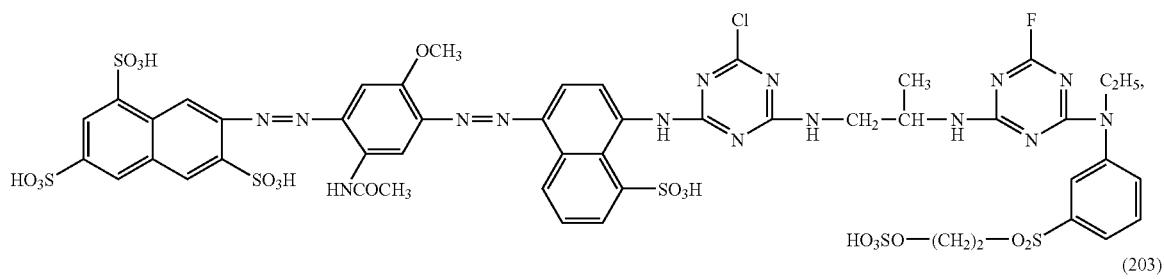
(202)
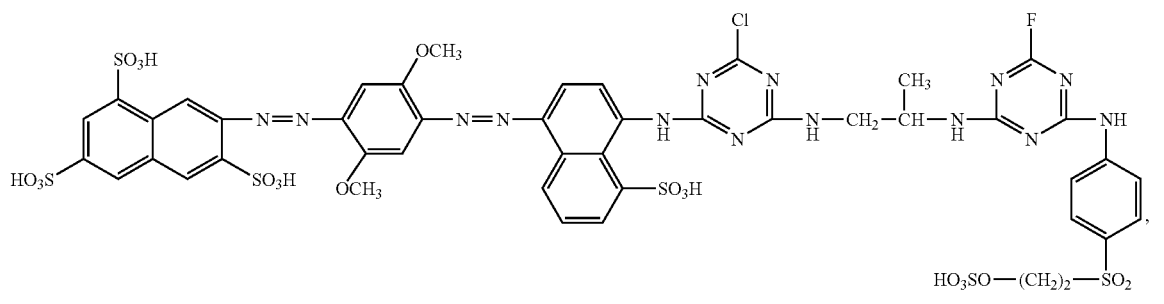
(203)
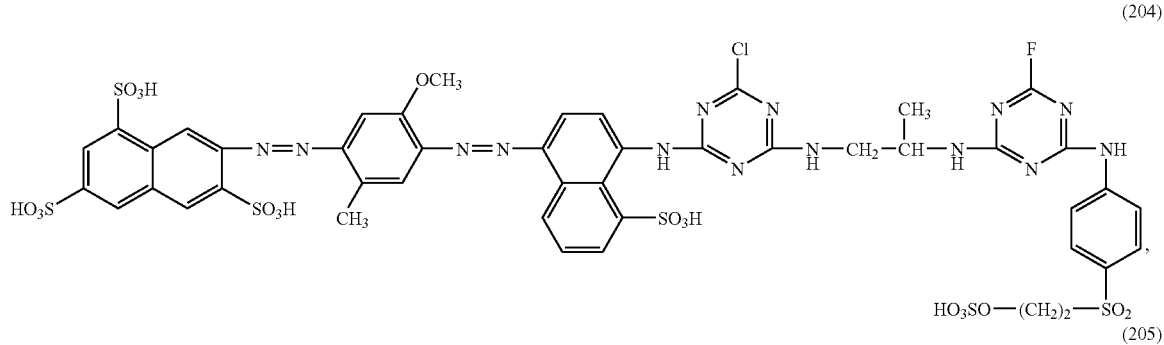
(204)
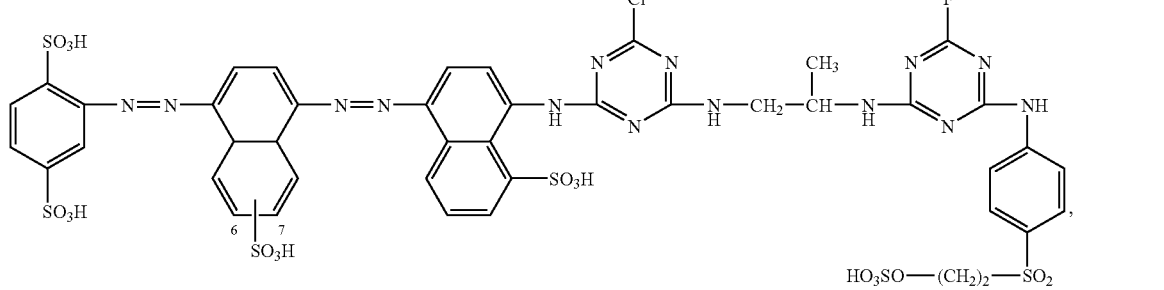
(205)
preferably a dye of formula (201).

The dye of formula (3) is, for example, a dye of formula

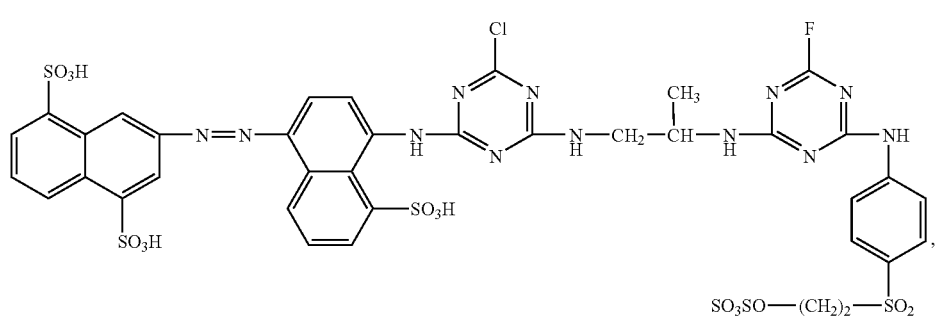
(301)

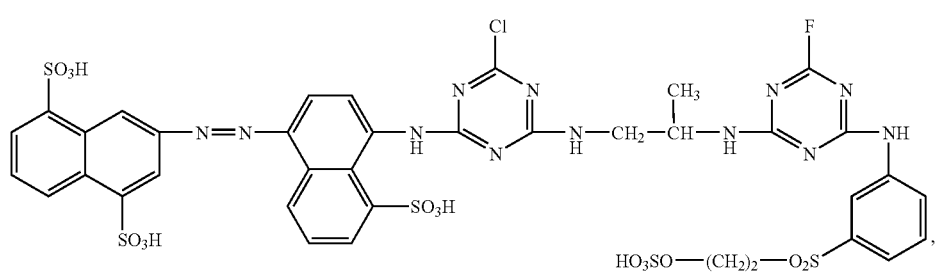
(302)

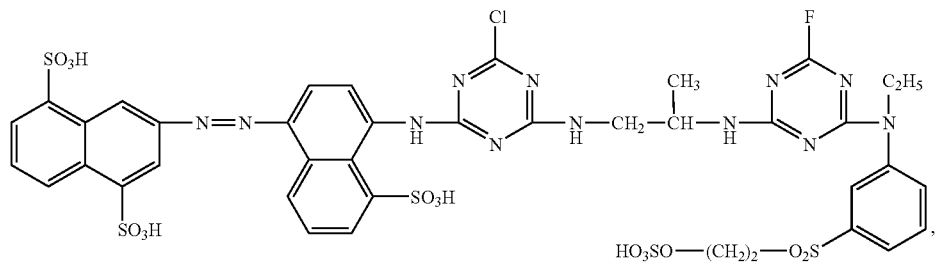
(303)

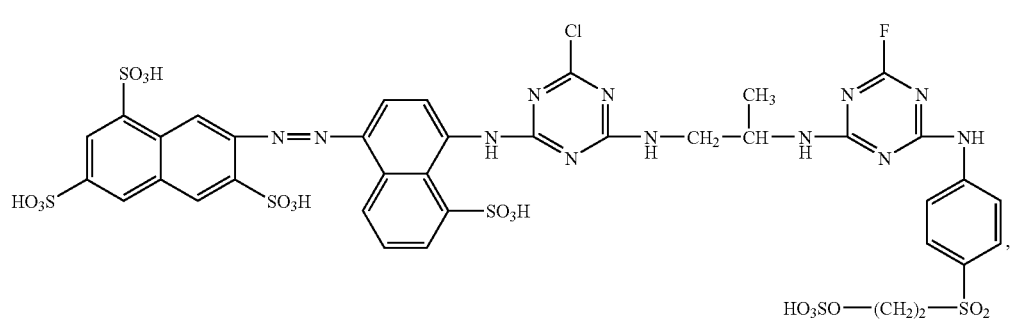
(304)

preferably a dye of formula (301).

The reactive dyes of formulae (1) to (3) in the dye mixtures according to the invention contain sulfo groups which are in each case either in the form of the free sulfonic acid or preferably in the form of a salt thereof, for example in the form of a sodium, lithium, potassium or ammonium salt or in the form of a salt of an organic amine, for example a triethanol-ammonium salt.

The dyes of formulae (1), (2) and (3) are known in some cases or they can be prepared in accordance with processes known per se. Such processes are described, for example, in EP-A-1 299 594 and EP-A-0 755 985. Dyes of formula (1) are disclosed, for example, in European Patent Application No. EP 05 107 317.9. Some of the dyes of formula (2) are known from EP-A-1 299 594.

The present invention therefore relates also to dyes of formula

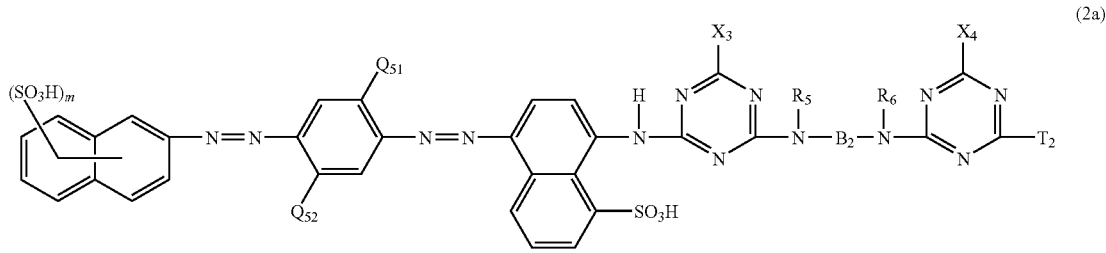

(2a)

wherein
$B_2, Q_{51}, Q_{52}, X_3, X_4, R_5, R_6, T_2$ and m each have the meanings and preferred meanings defined above.

The reactive dyes of formula (2a) can be obtained, for example, by reacting with one another, in any order, an amino compound of formula

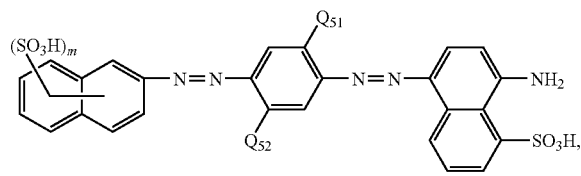

(6)

a diamine of formula    $R_5-HN-B_2-NH-R_6$,    (7)

a compound of formula    $T_2-H$,    (8)

-continued a compound of formula 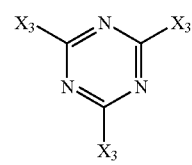 and    (9a)

a compound of formula 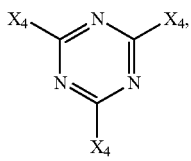,    (9b)

wherein $B_2, Q_{51}, Q_{52}, X_3, X_4, R_5, R_6, T_2$ and m each have the meanings and preferred meanings defined above.

A variant of the process comprises first condensing one of the compounds of formulae (6) and (8) with a compound of formula (9a) or (9b), condensing the condensation product with a diamine of formula (7) and reacting the resulting reaction product with the other compound of formula (6) or (8), which has been condensed beforehand with the other compound of formula (9a) or (9b).

The present invention relates also to dyes of formula

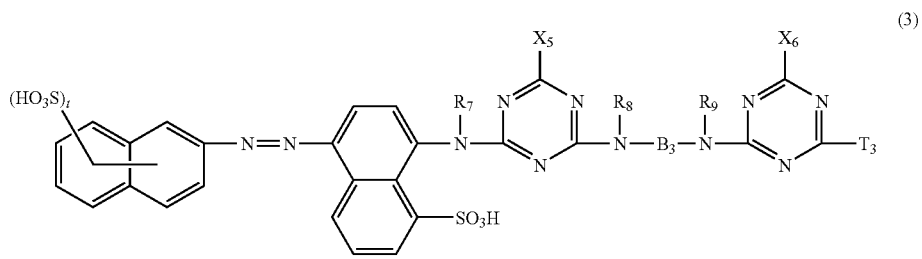

(3)

wherein
$B_3$, $X_5$, $X_6$, $R_7$, $R_8$, $R_9$, $T_3$ and t each have the meanings and preferred meanings defined above.

The reactive dyes of formula (3) can be obtained in a manner analogous to the compounds of formula (2a), for example by reacting with one another, in any order, an amino compound of formula

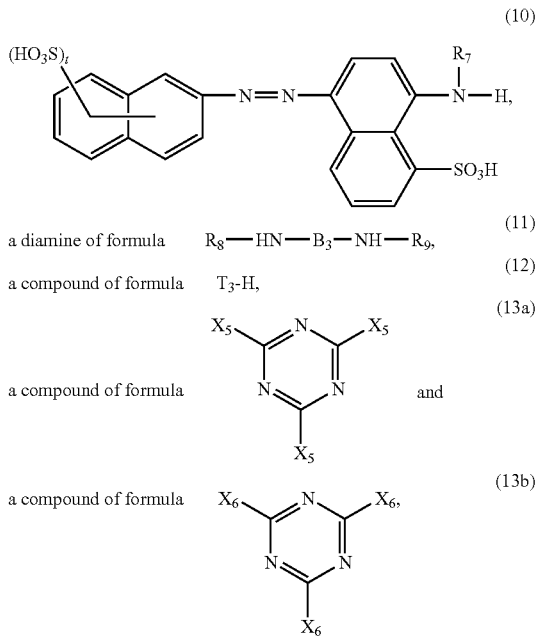

a diamine of formula $R_8$—HN—$B_3$—NH—$R_9$, (11)

a compound of formula $T_3$-H, (12)

a compound of formula (13a)

and a compound of formula (13b)

wherein $B_3$, $X_5$, $X_6$, $R_7$, $R_8$, $R_9$, $T_3$ and t each have the meanings and preferred meanings defined above.

A variant of the process comprises first condensing one of the compounds of formulae (10) and (12) with a compound of formula (13a) or (13b), condensing the condensation product with a diamine of formula (11) and reacting the resulting reaction product with the other compound of formula (10) or (12), which has been condensed beforehand with the other compound of formula (13a) or (13b).

In the preparation of a reactive dye of formula (2a) or (3) there are preferably used equimolar amounts of compounds of formulae (6), (7), (8), (9a) and (9b) or of formulae (10), (11), (12), (13a) and (13b).

The condensation reactions between the compounds of formulae (6), (7), (8), (9a) and (9b) or between the compounds of formulae (10), (11), (12), (13a) and (13b) are generally carried out analogously to known processes, usually in aqueous solution at temperatures of, for example, from 0 to 50° C. and a pH of, for example, from 4 to 10. The compounds of formulae (6), (7) and (8) or of formulae (10), (11) and (12) as well as the cyanuric halides of formulae (9a) and (9b) or of formulae (13a) and (13b) are known or can be prepared analogously to known compounds.

The end product can optionally also be subjected to a transformation reaction. Such a trans-formation reaction is, for example, the conversion of a vinylatable reactive group $T_1$, $T_2$ or $T_3$ (Z or Q) into its vinyl form by treatment with dilute sodium hydroxide solution, such as, for example, the conversion of the β-sulfatoethylsulfonyl or β-chloroethylsulfonyl group into the vinylsulfonyl radical or the conversion of the α,β-dihalopropionylamino group into the α-halo-acryloylamino radical. Such reactions are known per se. Those transformation reactions are generally effected in a neutral to alkaline medium at a temperature of for example, from 20 to 70° C., at a pH of, for example, from 6 to 14.

As cyanuric halides of formulae (9a) and (9b) and of formula (13a) or (13b) there are suitable, for example, cyanuric chloride and cyanuric fluoride. Especially suitable as a cyanuric halide of formula (9b) or formula (13b) is cyanuric fluoride.

The present invention relates also to the dye radical of formula

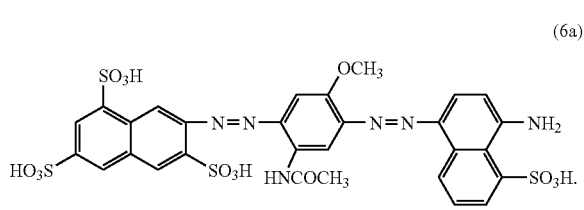

The dye radical of formula (6a) can be prepared analogously to known processes.

Advantageously, in a first step 2-naphthylamine-3,6,8-trisulfonic acid is diazotised and the diazotised compound is coupled to 3-amino-4-methoxyacetanilide. The monoazo compound obtained in that way is then diazotised and coupled to 1-naphthylamine-8-sulfonic acid.

Diazotisation is effected in customary manner, for example with a nitrite, e.g. with an alkali metal nitrite, such as sodium nitrite, in a mineral-acid-containing medium, for example a hydrochloric-acid-containing medium, at temperatures of, for example, from –5 to 40° C., preferably at from 0 to 25° C. The coupling is effected in a manner known per se, at an acidic or neutral to weakly alkaline pH value, for example at a pH of from 1 to 10, advantageously at pH 3 to 7, and temperatures of, for example, from –5 to 40° C., preferably from 0 to 35° C.

The dye mixtures according to the invention can be prepared, for example, by mixing the individual dyes together. The mixing procedure is effected, for example, in suitable mills, e.g. ball mills or pin mills, as well as in kneaders or mixers. The dye mixtures according to the invention can also be prepared, for example, by dissolving the reactive dyes of formulae (1), (2) and (3) directly in the dyebath or the printing medium. The amount of the individual reactive dyes is governed by the shade to be obtained. The dye of formula (1) and the total amount of the dyes of formulae (2) and (3) are present in the dye mixtures according to the invention in a ratio by weight of, for example, from 1:99 to 99:1, preferably from 5:95 to 95:5 and especially from 10:90 to 90:10.

The reactive dyes of formulae (1), (2) and (3) and accordingly also the dye mixtures according to the invention may comprise further additives, for example sodium chloride or dextrin.

If desired, the reactive dyes of formulae (1), (2) and (3) and the dye mixtures according to the invention may comprise further auxiliaries which, for example, improve handling or increase storage stability, such as buffers, dispersants or antidusts. Such auxiliaries are known to the person skilled in the art.

The dye mixtures according to the invention and the reactive dyes according to the invention are suitable for the dyeing and printing of an extremely wide variety of materials, especially hydroxy-group-containing or nitrogen-containing fibre materials. Examples thereof are paper, silk, leather, wool, polyamide fibres and polyurethanes as well as, especially, cellulosic fibre materials of all kinds. Such fibre materials are, for example, natural cellulose fibres, such as cotton, linen and hemp, as well as cellulose and regenerated cellulose. The dye mixtures according to the invention and the reactive dyes according to the invention are also suitable for the dyeing or printing of hydroxy-group-containing fibres that are contained in blend fabrics, for example mixtures of cotton with polyester fibres or polyamide fibres.

The present invention relates also to a method for the dichromatic or trichromatic dyeing or printing of hydroxy-group-containing or nitrogen-containing fibre materials, especially cellulosic fibre materials, which method comprises using at least one dye, for example one, two or three dyes, preferably one dye, of the above-mentioned formula (1), together with at last one dye, for example one, two or three dyes, from the group of the above-mentioned formulae (2) and (3), wherein $B_1$, $B_2$, $B_3$, $Q_1$, $Q_2$, $Q_3$, $Q_4$, $Q_5$, $R_1$, $R_2$, $R_3$, $R_4$, $R_5$, $R_6$, $R_7$, $R_8$, $R_9$, $X_1$, $X_2$, $X_3$, $X_4$, $X_5$, $X_6$, $T_1$, $T_2$, $T_3$, k, m, n, p, q and t each have the meanings and preferred meanings defined above.

Preference is given to corresponding methods for the trichromatic dyeing or printing of hydroxy-group-containing or nitrogen-containing fibre materials wherein at least one dye of the above-mentioned formula (1) is used together with at least one dye of the above-mentioned formula (2) and together with at least one dye of the above-mentioned formula (3).

The dyes or dye mixtures according to the invention are suitable for customary dyeing and printing methods and can be applied to the fibre material and fixed thereto in a wide variety of ways, especially in the form of aqueous dye solutions or print pastes. Accordingly, the method according to the invention for dichromatic or trichromatic dyeing or printing can also be carried out in accordance with customary dyeing or printing methods. The resulting dye solutions are suitable both for the exhaust method and for pad-dyeing, in which the goods are impregnated with aqueous, optionally salt-containing dye solutions, and the dyes are fixed after an alkali treatment or in the presence of alkali, optionally under the action of heat. The dyes and dye mixtures according to the invention and the method for dichromatic or trichromatic dyeing according to the invention are likewise suitable for the so-called cold pad-batch process, in which the dye is applied, together with the alkali, on the padder and is then fixed by storage for several hours at room temperature.

The dye liquors or print pastes, in addition to containing water and the dyes, may also comprise further additives, for example toning dyes known per se, salts, buffer substances, wetting agents, anti-foams, levelling agents or agents that influence the properties of the textile material, for example softeners, additives for flame-resistant finishes or dirt-, water- or oil-repellants, as well as water-softeners and natural or synthetic thickeners, e.g. alginates or cellulose ethers.

The amounts in which the individual dyes are used in the dyebaths or print pastes can vary within wide limits in dependence upon the desired depth of shade; in general, amounts of from 0.01 to 15% by weight especially from 0.1 to 10% by weight, based on the goods being dyed or on the print paste, have proved advantageous.

The dyes of formulae (1), (2) and (3) used in the method according to the invention and the dyes of formulae (2a) and (3) according to the invention are distinguished in dichromatic or trichromatic dyeing or printing by uniform colour build-up, good exhaustion and fixing behaviour, good constancy of shade even in different concentrations, good fastness properties and, in particular, very good combinability. The dyeings and prints produced in accordance with the method of the invention have very good reproducibility.

The said textile material may be in an extremely wide variety of processing forms, such as, for example, in the form of fibres, yarn, woven fabric or knitted fabric.

The dyeings and prints produced using the dyes and dye mixtures according to the invention exhibit good light fastness and very good wet-fastness properties, such as fastness to washing, to water, to sea water, to cross-dyeing and to perspiration, as well as good fastness to chlorine, to pleating, to hot-pressing and to rubbing.

The dyes and dye mixtures according to the invention are also suitable as colorants for use in recording systems. Such recording systems are, for example, commercially available ink-jet printers for paper or textile printing, or writing implements, such as fountain pens or ball-point pens, and especially ink-jet printers. For that purpose, the dye mixture according to the invention or the dyes according to the invention are first converted into a form suitable for use in recording systems. A suitable form is, for example, an aqueous ink comprising the dye mixture according to the invention or the dyes according to the invention as colorant. The inks can be prepared in customary manner by mixing together the individual constituents customary in ink-jet printing in the desired amount of water.

Examples of substrates that come into consideration for ink-jet printing, in addition to paper or plastics films, include the above-mentioned hydroxy-group-containing or nitrogen-containing fibre materials, especially cellulosic fibre materials. The substrates are preferably textile fibre materials.

The following Examples serve to illustrate the invention. Unless otherwise indicated, temperatures are given in degrees Celsius, parts are parts by weight and percentages relate to percent by weight. Parts by weight relate to parts by volume in a ratio of kilograms to liters.

EXAMPLE 1

(a) 38.4 parts of 2-naphthylamine-3,6,8-trisulfonic acid are homogenised in 80 parts of water, and 12 parts of concentrated hydrochloric acid are added. The temperature of the mixture is adjusted to 10° C. with 20 parts of ice. 25 parts of 4N sodium nitrite solution are slowly added to the resulting mixture at a temperature of 10-25° C.

(b) The diazo suspension obtained according to step (a) is added at a temperature of 15-25° C. to a mixture of 18 parts of 3-amino-4-methoxyacetanilide in 100 parts of water, the pH being maintained at 5.5 by addition of a soda solution.

(c) 22 parts of concentrated hydrochloric acid and 40 parts of ice are added to the solution obtained according to step (b), and then 26 parts of 4N sodium nitrite solution are slowly added at a temperature of 15-20° C.

(d) The diazo solution obtained according to step (c) is slowly added, at pH 6.2 to 6.5 and a temperature of 20-25° C., to a mixture of 22.3 parts of 1-naphthylamine-8-sulfonic acid in 150 parts of water and 10 parts of 30% sodium hydroxide solution. The resulting dye is then precipitated by addition of 90 parts of sodium chloride. Filtration and washing of the precipitate yields 150 parts of a moist product which, in the form of the free acid, corresponds to a dye radical of formula (6a)

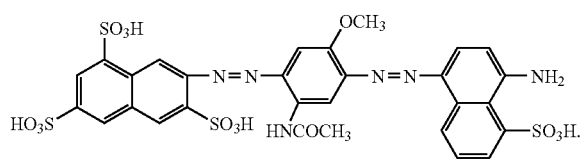

($\lambda_{max}$ = 581 nm)

EXAMPLE 2

(a) The product obtained according to Example 1(d) is dissolved in 700 parts of water and, at a temperature of 5 to 20° C., slowly added to a suspension of 18.4 parts of cyanuric chloride in 50 parts of ice. By addition of alkali the pH is maintained at 6.5 and the temperature at 20° C. for a further three hours.

(b) A mixture of 7.9 parts of 1,2-propylenediamine in 50 parts of water and 20 parts of concentrated hydrochloric acid is metered into the solution from step (a) which has been heated to 40-50° C. The pH is maintained at 5.5 by addition of alkali and the mixture is stirred for three hours at 45° C. The reaction solution is then freed of inorganic salts by dialysis.

(c) 38.2 parts of 4-(β-sulfatoethylsulfonyl)aniline and 3 parts of sodium fluoride are dissolved in 350 parts of water at pH 5 to 6 by addition of 25 parts of 4N soda solution. The solution is cooled by addition of 70 parts of ice. 19.4 parts of cyanuric fluoride are added to the resulting mixture, with stirring, within a period of from 5 to 10 minutes. Stirring is continued for a further 10 minutes and then the pH of the reaction solution is adjusted to from 5.3 to 5.5 by addition of 4N soda solution, a suspension being formed.

(d) The reaction solution from step (b) is allowed to react completely, at 20-30° C. and pH 6.5 to 7.0, with the suspension obtained according to step (c). The pH of the reaction solution is then adjusted to 10.5 and vinylation is carried out at a temperature of 30° C. within a period of 30 minutes, the pH being maintained at 10.5 by addition of alkali. The reaction mixture is then adjusted to pH 6.5 to 7.0 with hydrochloric acid, clarified by filtration, freed of salt by dialysis and concentrated, yielding 190 parts of a compound which, in the form of the free acid, corresponds to formula (b) At a temperature of 5-15° C. and a pH of from 3.0 to 4.0, a neutral solution of 44.7 parts of 1-naphthylamine-8-sulfonic acid in 280 parts of water and 33 parts of 30% sodium hydroxide solution is metered into the diazo suspension obtained according to step (a) and stirring is then carried out for 30 minutes at pH 3.5. The reaction solution contains a dye radical which, in the form of the free acid, corresponds to formula

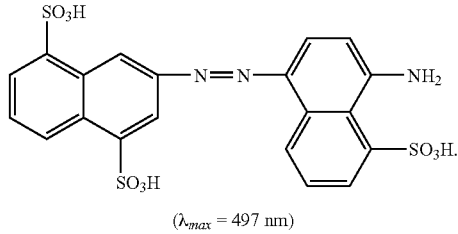

(10a)

($\lambda_{max}$ = 497 nm)

EXAMPLE 8

(a) To the reaction solution obtained according to Example 7(b), which is cooled with 200 parts of ice, there is added a suspension of 40.6 parts of cyanuric chloride in 50 parts of ice. The pH is maintained at from 5.0 to 6.0 by addition of concentrated sodium hydroxide solution. The temperature rises to 20° C. in the course of 3 hours.

(b) A neutral solution of 16.3 parts of 1,2-propylenediamine in 100 parts of water and 47.6 parts of concentrated

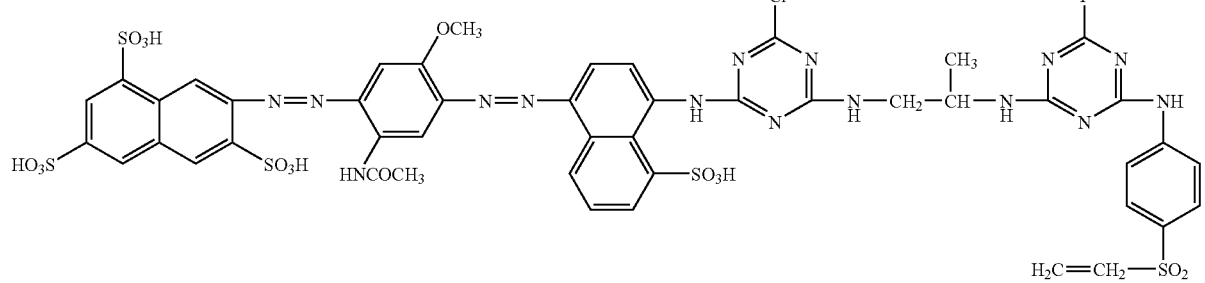

(201a)

($\lambda_{max}$=504 nm) and dyes cotton in a brown shade having good all-round fastness properties. The dye of formula (201a) is the vinylated form of the dye of formula (201).

EXAMPLES 3 TO 6

In a manner analogous to that described in Examples 1 and 2, the dyes of the above-mentioned formulae (202) $\lambda_{max}$=499 nm, (203) $\lambda_{max}$=517 nm, (204) $\lambda_{max}$=502 nm and (205) $\lambda_{max}$=492 nm in the vinylated form are obtained which dye cotton in brown shades having good all-round fastness properties.

EXAMPLE 7

(a) 60.7 parts of 2-naphthylamine-4,8-disulfonic acid are dissolved in 250 parts of water with 26.5 parts of 30% sodium hydroxide solution to form a neutral solution. 60 parts of 4N sodium nitrite solution are added to the resulting solution. The solution obtained is slowly added dropwise to a mixture of 70 parts of ice and 56 parts of concentrated hydrochloric acid. Stirring is carried out for a further 30 minutes and any excess nitrite is destroyed.

hydrochloric acid is metered into the reaction mixture from step (a) which has been heated to 40-50° C., the pH being maintained between 5.0 and 5.5 by addition of 50.3 parts of 30% sodium hydroxide solution. The mixture is then allowed to react for a further three hours at 40-50° C. and pH 5.5, whereupon a precipitate is formed. Precipitation is completed by addition of 170 parts of sodium chloride. The precipitate is filtered off and 360 parts of a moist reaction product are obtained as filter cake.

(c) The reaction product obtained according to step (b) is stirred in 500 parts of water and the pH of the mixture is adjusted to 7.0 and the temperature to 40° C. A suspension obtained according to Example 2(c) from 61.8 parts of 4-(β-sulfatoethylsulfonyl)aniline and 31.2 parts of cyanuric fluoride is metered into the resulting mixture, the pH being maintained at 7.0 with the aid of concentrated sodium hydroxide solution. Stirring is carried out for a further 30 minutes. The pH of the reaction solution is then adjusted to 10.5 and vinylation is carried out within a period of 30 minutes. The reaction mixture is then adjusted to pH 6.5 to 7.0 with hydrochloric acid, clarified by filtration, freed of salt by dialysis and concentrated, yielding a compound which, in the form of the free acid, corresponds to formula

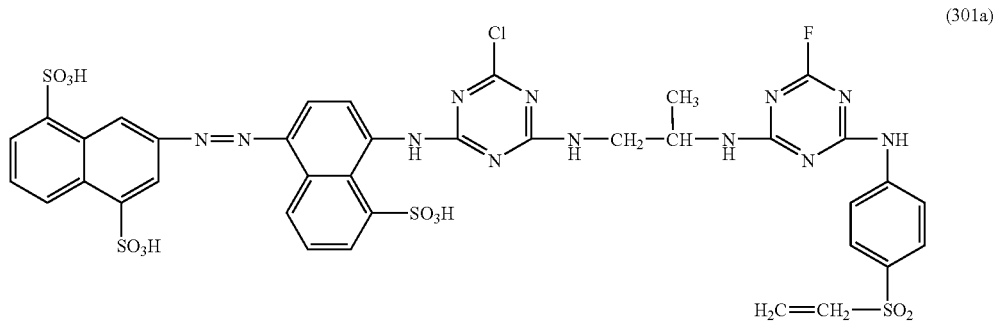

(301a)

($\lambda_{max}$=422 nm) and dyes cotton a yellow shade having good all-round fastness properties. The dye of formula (301a) is the vinylated form of the dye of formula (301).

EXAMPLES 9 TO 11

In a manner analogous to that described in Example 8, the dyes of the above-mentioned formulae (302) $\lambda_{max}$=422 nm, (303) $\lambda_{max}$=422 nm and (304) $\lambda_{max}$=428 nm in the vinylated form are obtained which dye cotton in yellow shades having good all-round fastness properties.

Dyeing Procedure I 100 parts of cotton fabric are placed at 60° C. in 1500 parts of a dyebath containing 45 g/l of sodium chloride and 2 parts of the reactive dye of formula (201a) obtained according to Example 2. After 45 minutes at 60° C., 20 g/l of calcined soda are added. Dyeing is continued at that temperature for a further 45 minutes. The dyed goods are then rinsed, soaped at boiling for a quarter of an hour with a non-ionic detergent, rinsed again and dried.

As an alternative to that procedure, dyeing can be carried out at 80° C. instead of at 60° C.

Dyeing Procedure II 0.1 part of the dye of formula (201a) according to Example 2 is dissolved in 200 parts of water, and 0.5 part of sodium sulfate, 0.1 part of a levelling agent (based on the condensation product of a higher aliphatic amine and ethylene oxide) and 0.5 part of sodium acetate are added. The pH is then adjusted to a value of 5.5 with acetic acid (80%). The dyebath is heated at 50° C. for 10 minutes and then 10 parts of a woollen fabric are added. The dyebath is heated to a temperature of 100° C. within a period of about 50 minutes and dyeing is carried out at that temperature for 60 minutes. The dyebath is then cooled to 90° C. and the dyed goods are removed. The woollen fabric is washed with warm and cold water, then spun and dried.

Printing Procedure

While stirring rapidly, 3 parts of the dye of formula (201a) obtained according to Example 2 are sprinkled into 100 parts of a stock thickener containing 50 parts of 5% sodium alginate thickener, 27.8 parts of water, 20 parts of urea, 1 part of sodium m-nitrobenzenesulfonate and 1.2 parts of sodium hydrogen carbonate. The print paste so obtained is used to print a cotton fabric; drying is carried out and the resulting printed material is steamed in saturated steam at 102° C. for 2 minutes. The printed fabric is then rinsed, if desired soaped at boiling and again rinsed, and then dried.

TRICHROMATIC PRINCIPLE EXAMPLE 1

Pad-batch method

On a padder having a squeezing effect of 70% liquor pick-up, a bleached cotton cretonne fabric is impregnated with an aqueous liquor containing, per liter,
1.5 g of the yellow-dyeing dye of formula (301a),
0.5 g of the brown-dyeing dye of formula (201a),
2.0 g of the olive-dyeing dye of formula (101),
1 g of a wetting agent,
5 g of sodium hydroxide and
80 g of sodium silicate 38° Bé.

The immersion time is 2 seconds. After padding, the fabric is rolled up and then stored for 12 hours at a temperature of 25° C. After storage, the dyed cotton material is cold-rinsed and then hot-rinsed with water, subsequently soaped, hot-rinsed and warm-rinsed.

A light-khaki shade having very good fastness properties is obtained.

In a manner analogous to that described in Trichromatic Principle Example 1, instead of the yellow-dyeing dye of formula (301a) it is possible to use the equivalent amount of a yellow-dyeing dye of formula (302), (303) or (304) in the vinylated form. In that way there is likewise obtained a light-khaki shade having very good fastness properties.

In a manner analogous to that described in Trichromatic Principle Example 1, instead of the brown-dyeing dye of formula (201a) it is possible to use the equivalent amount of a brown-dyeing dye of formula (202), (203), (204) or (205) in the vinylated form. In that way there is likewise obtained a light-khaki shade having very good fastness properties.

In a manner analogous to that described in Trichromatic Principle Example 1, instead of the olive-dyeing dye of formula (101) it is possible to use the equivalent amount of a dye of formula (102), (103), (106), (107) or (108) or the equivalent amount of a dye of formula (104) or (105) in the vinylated form. In that way there is likewise obtained a light-khaki shade having very good fastness properties.

TRICHROMATIC PRINCIPLE EXAMPLE 2

Pad-steam Method

On a padder having a squeezing effect of 100% liquor pick-up, a bleached cotton terry fabric is impregnated with an aqueous liquor containing, per liter,
0.25 g of the yellow-dyeing dye of formula (301a),
0.32 g of the brown-dyeing dye of formula (201a),
0.59 g of the olive-dyeing dye of formula (101),
1 g of a wetting agent,
10 g of sodium chloride and
5 g of sodium carbonate.

The immersion time is 2.5 seconds. After padding, the fabric is steamed for one minute at 100° C. and then rinsed with water, subsequently soaped, hot-rinsed and warm-rinsed.

A light-beige shade having very good fastness properties is obtained.

In a manner analogous to that described in Trichromatic Principle Example 2, instead of the yellow-dyeing dye of formula (301a) it is possible to use the equivalent amount of a yellow-dyeing dye of formula (302), (303) or (304) in the vinylated form. In that way there is likewise obtained a light-beige shade having very good fastness properties.

In a manner analogous to that described in Trichromatic Principle Example 2, instead of the brown-dyeing dye of formula (201a) it is possible to use the equivalent amount of a brown-dyeing dye of formula (202), (203), (204) or (205) in the vinylated form. In that way there is likewise obtained a light-beige shade having very good fastness properties.

In a manner analogous to that described in Trichromatic Principle Example 2, instead of the olive-dyeing dye of formula (101) it is possible to use the equivalent amount of a dye of formula (102), (103), (106), (107) or (108) or the equivalent amount of a dye of formula (104) or (105) in the vinylated form. In that way there is likewise obtained a light-beige shade having very good fastness properties.

TRICHROMATIC PRINCIPLE EXAMPLE 3

Pad-dry-pad-steam Method

On a padder having a squeezing effect of 65% liquor pick-up, a bleached cotton gabardine fabric is impregnated with an aqueous liquor containing, per liter, 3.30 g of the yellow-dyeing dye of formula (301a),
7.90 g of the brown-dyeing dye of formula (201a),
9.60 g of the olive-dyeing dye of formula (101),
1 g of a wetting agent and
10 g of a migration inhibitor (acrylate-based).

The immersion time is 2 seconds. After padding, the fabric is dried for one minute at 120° C. The dyed material is then impregnated with an aqueous liquor containing, per liter, 200 g of sodium chloride, 5 g of sodium hydroxide and 20 g of sodium carbonate.

The immersion time is 2 seconds. After padding, the fabric is steamed for one minute at 100° C. and then rinsed with water, subsequently soaped, hot-rinsed and warm-rinsed.

A brown shade having very good fastness properties is obtained.

In a manner analogous to that described in Trichromatic Principle Example 3, instead of the yellow-dyeing dye of formula (301a) it is possible to use the equivalent amount of a yellow-dyeing dye of formula (302), (303) or (304) in the vinylated form. In that way there is likewise obtained a brown shade having very good fastness properties.

In a manner analogous to that described in Trichromatic Principle Example 3, instead of the brown-dyeing dye of formula (201a) it is possible to use the equivalent amount of a brown-dyeing dye of formula (202), (203), (204) or (205) in the vinylated form. In that way there is likewise obtained a brown shade having very good fastness properties.

In a manner analogous to that described in Trichromatic Principle Example 3, instead of the olive-dyeing dye of formula (101) it is possible to use the equivalent amount of a dye of formula (102), (103), (106), (107) or (108) or the equivalent amount of a dye of formula (104) or (105) in the vinylated form. In that way there is likewise obtained a brown shade having very good fastness properties.

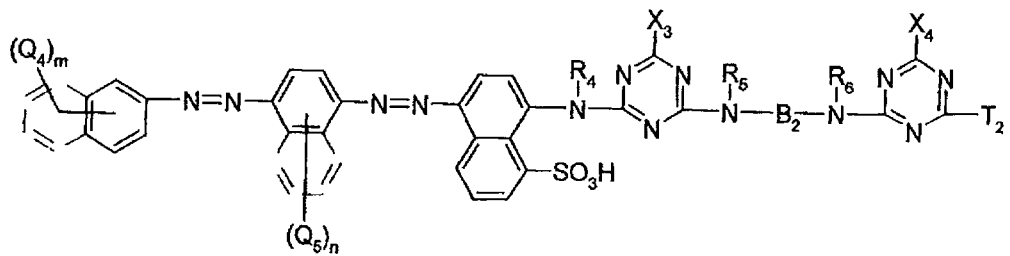

What is claimed is:
1. A dye mixture, comprising at least one dye of formula

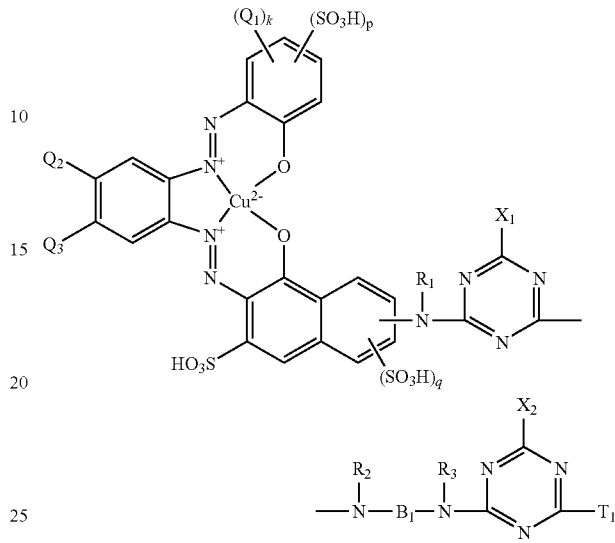

(1)

and at least one dye from the group of formulae

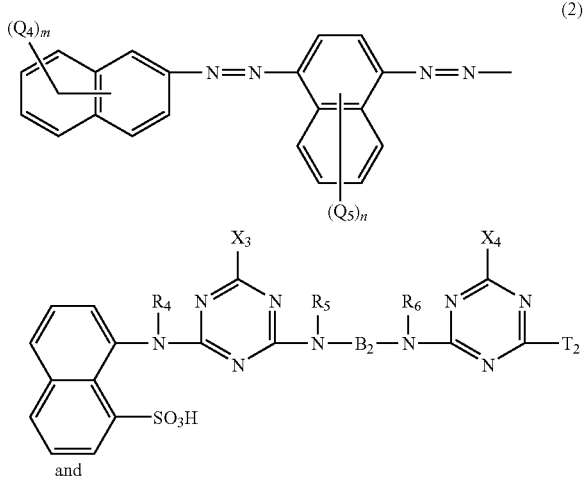

(2)

and

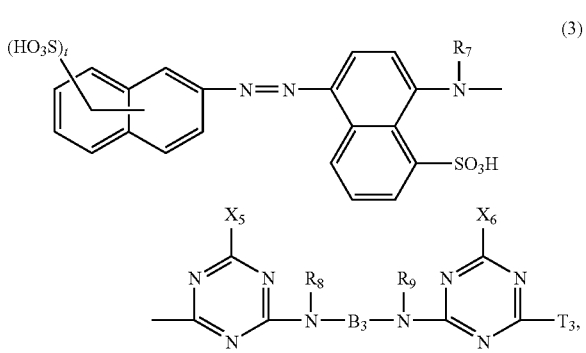

(3)

wherein
$B_1$, $B_2$ and $B_3$ are each independently of the others an organic bridging member,
$Q_1$ is $C_1$-$C_4$ alkyl, halogen or a radical —$SO_2$-Z, $Q_2$ and $Q_3$ are each independently of the other $C_1$-$C_4$ alkoxy, $Q_4$ is $C_1$-$C_4$ alkoxy, $C_1$-$C_4$ alkyl, halogen or sulfo, $Q_5$ is $C_1$-$C_4$ alkoxy, $C_1$-$C_4$ alkyl, $C_1$-$C_4$ alkanoylamino, ureido, halogen or sulfo, $R_1$, $R_2$, $R_3$, $R_4$, $R_5$, $R_6$, $R_7$, $R_8$ and $R_9$ are each independently of the others hydrogen or unsubstituted or substituted $C_1$-$C_4$ alkyl, k and q are each independently of the other the number 0 or 1, n and p are each independently of the other the number 0, 1 or 2, m is the number 0, 1, 2 or 3, t is the number 1, 2 or 3, $X_1$, $X_2$, $X_3$, $X_4$, $X_5$ and $X_6$ are each independently of the others halogen, and $T_1$, $T_2$ and $T_3$ are each independently of the others a non-fibre-reactive substituent or a fibre-reactive radical of formula

  (4a)

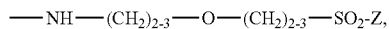  (4b)

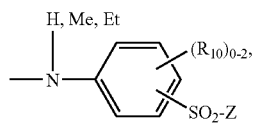  (4c)

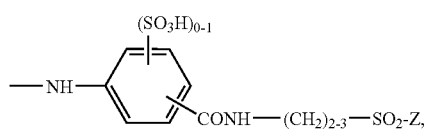  (4d)

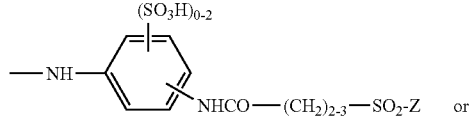  (4e)

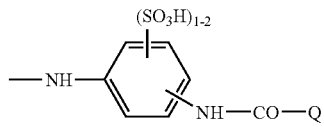  (4f)

wherein $(R_{10})_{0-2}$ denotes from 0 to 2 identical or different substituents from the group halogen, $C_1$-$C_4$ alkyl, $C_1$-$C_4$ alkoxy and sulfo, Z is vinyl or a radical —$CH_2$—$CH_2$—U and U is a group removable under alkaline conditions, Q is a group —CH(Hal)-$CH_2$-Hal or —C(Hal)=$CH_2$, and Hal is halogen.

2. A dye mixture according to claim 1, wherein $Q_2$ and $Q_3$ are methoxy.

3. A dye mixture according to claim 1, wherein $R_1$, $R_4$ and $R_7$ are each independently of the others hydrogen or $C_1$-$C_4$ alkyl.

4. A dye mixture according to claim 1, wherein $R_2$, $R_3$, $R_5$, $R_6$, $R_8$ and $R_9$ are each independently of the others hydrogen or $C_1$-$C_4$ alkyl.

5. A dye mixture according to claim 1, wherein $B_1$, $B_2$ and $B_3$ are each independently of the others a $C_2$-$C_{12}$ alkylene radical which may be interrupted by 1, 2 or 3 —O— members and is unsubstitured or substituted by hydroxy, sulfo, sulfato, cyano or by carboxy, or a phenylene radical unsubstituted or substituted by $C_1$-$C_4$ alkyl, $C_1$-$C_4$ alkoxy, $C_2$-$C_4$ alkanoylamino, sulfo, halogen or by carboxy.

6. A dye mixture according to claim 1, wherein $X_1$, $X_2$, $X_3$, $X_4$, $X_5$ and $X_6$ are each independently of the others fluorine or chlorine.

7. A dye mixture according to claim 1, wherein the dye of formula (1) corresponds to a dye of formula

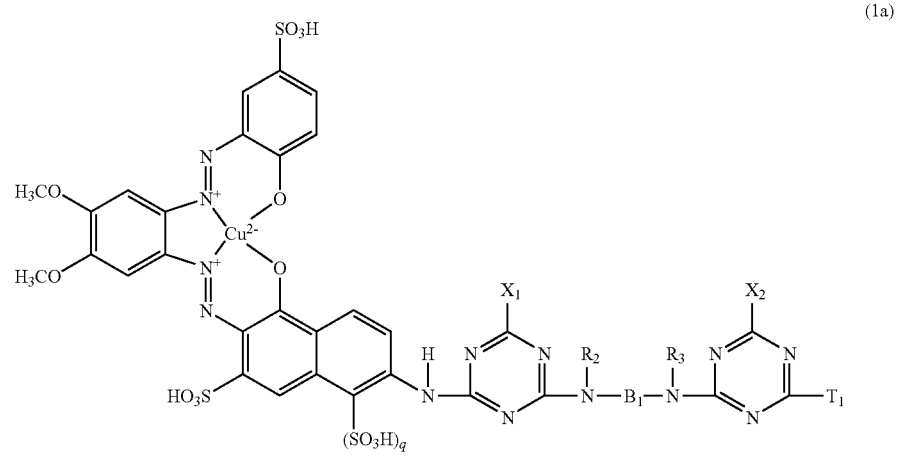  (1a)

wherein

B$_1$, X$_1$, X$_2$, R$_2$, R$_3$, T$_1$ and q are each as defined in claim 1.

8. A dye mixture according to claim 1, wherein the dye of formula (2) corresponds to a dye of formula

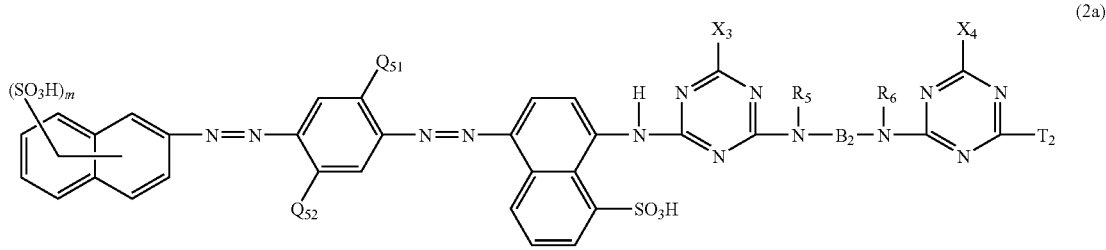

(2a)

wherein

B$_2$, X$_3$, X$_4$, R$_5$, R$_6$ and T$_2$ are each as defined in claim 1 and m is the number 1, 2 or 3, Q$_{51}$ is C$_1$-C$_4$ alkoxy, C$_1$-C$_4$ alkyl, halogen or sulfo, and Q$_{52}$ is C$_1$-C$_4$ alkoxy, C$_1$-C$_4$ alkyl, C$_1$-C$_4$ alkanoylamino or ureido.

9. A dye mixture according to claim 1, wherein the dye of formula (3) corresponds to a dye of formula

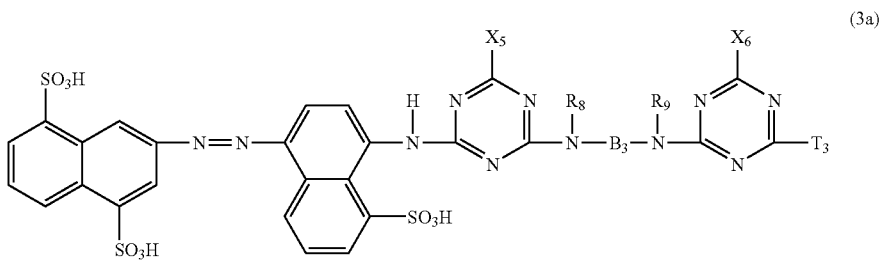

(3a)

wherein

B$_3$, X$_5$, X$_6$, R$_8$, R$_9$ and T$_3$ are each as defined in claim 1.

10. A method for the dichromatic or trichromatic dyeing or printing of hydroxy-group-containing or nitrogen-containing fibre materials, which method comprises using at least one dye of formula

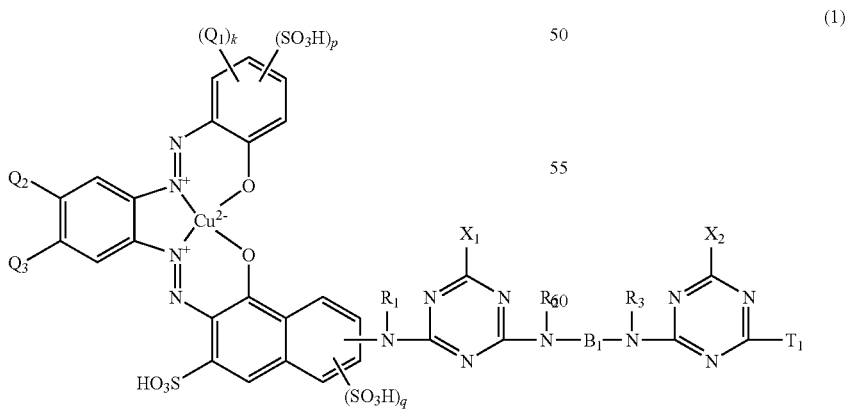

(1)

together with at least one dye from the group of formulae

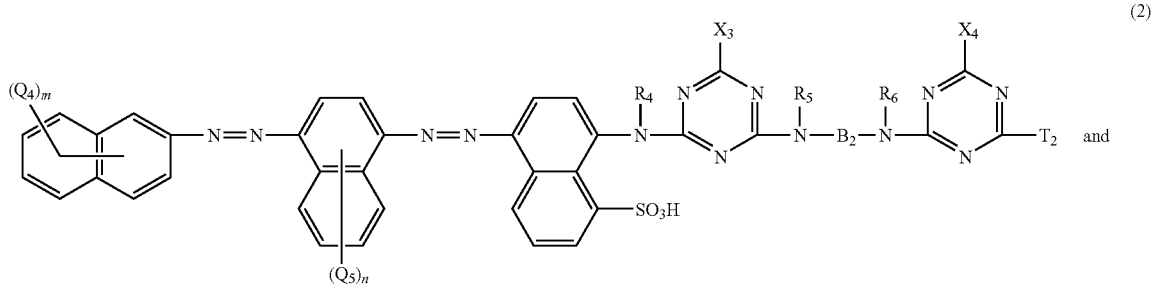
(2)

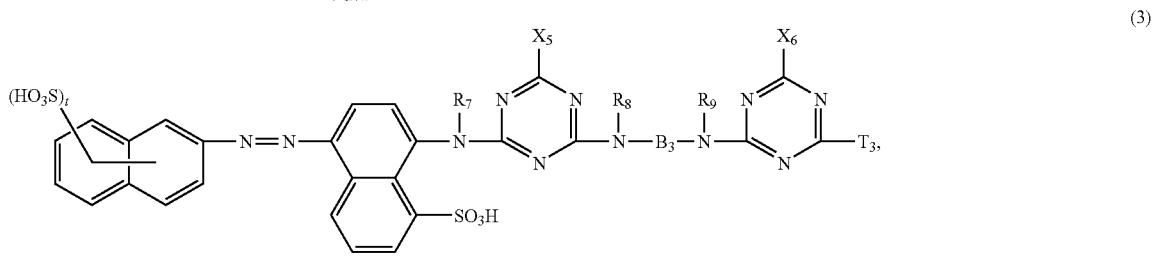
(3)

wherein $B_1, B_2, B_3, Q_1, Q_2, Q_3, Q_4, Q_5, R_1, R_2, R_3, R_4, R_5, R_6, R_7, R_8, R_9, X_1, X_2, X_3, X_4, X_5, X_6, T_1, T_2, T_3$, k, m, n, p, q and t are each as defined in claim 1.

11. A method according to claim 10, wherein cellulosic fibre material is dyed or printed.

12. A reactive dye of formula

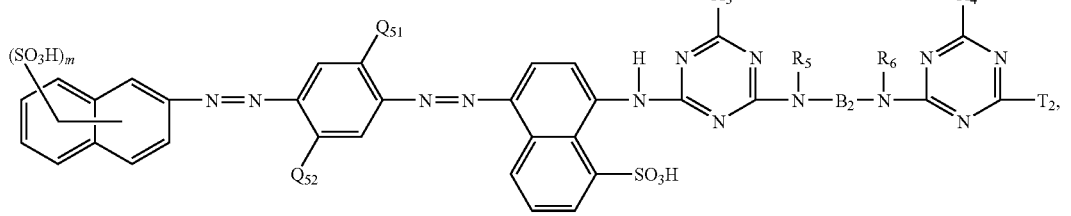
(2a)

wherein
- $B_2$ is an organic bridging member,
- $Q_{51}$ is $C_1$-$C_4$ alkoxy, $C_1$-$C_4$ alkyl, halogen or sulfo, and
- $Q_{52}$ is $C_1$-$C_4$ alkoxy, $C_1$-$C_4$ alkyl, $C_1$-$C_4$ alkanoylamino or ureido,
- $R_5$ and $R_6$ are each independently of the other hydrogen or unsubstituted or substituted $C_1$-$C_4$ alkyl,
- m is the number 1, 2 or 3,
- $X_3$ and $X_4$ are each independently of the other halogen, and
- $T_2$ is a non-fibre-reactive substituent or a fibre-reactive radical of formula —NH—(CH$_2$)$_{2\text{-}3}$—SO$_2$-Z, (4a)

—NH—(CH$_2$)$_{2\text{-}3}$—O—(CH$_2$)$_{2\text{-}3}$—SO$_2$-Z, (4b)

-continued

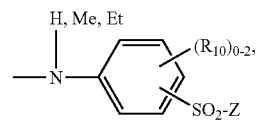
(4c)

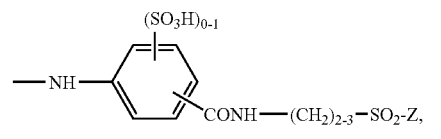
(4d)

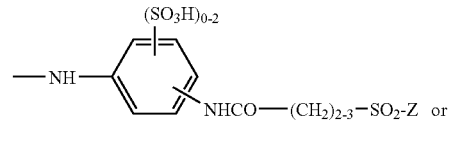
(4e)

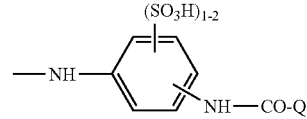
(4f)

wherein
(R$_{10}$)$_{0-2}$ denotes from 0 to 2 identical or different substituents from the group halogen,
C$_1$-C$_4$ alkyl, C$_1$-C$_4$ alkoxy and sulfo,
Z is vinyl or a radical —CH$_2$—CH$_2$—U and U is a group removable under alkaline conditions,
Q is a group —CH(Hal)-CH$_2$-Hal or —C(Hal)=CH$_2$, and
Hal is halogen.

13. A reactive dye of formula

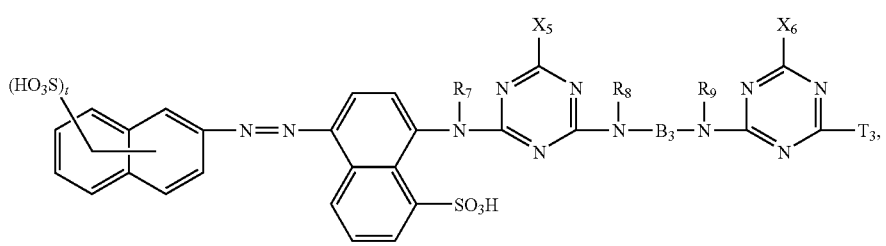

(3)

wherein
B$_3$ is an organic bridging member,
R$_7$, R$_8$ and R$_9$ are each independently of the others hydrogen or unsubstituted or substituted C$_1$-C$_4$ alkyl,
t is the number 1, 2 or 3,
X$_5$ and X$_6$ are each independently of the other halogen, and
T$_3$ is a non-fibre-reactive substituent or a fibre-reactive radical of formula —NH—(CH$_2$)$_{2-3}$—SO$_2$-Z, (4a)

—NH—(CH$_2$)$_{2-3}$—O—(CH$_2$)$_{2-3}$—SO$_2$-Z, (4b)

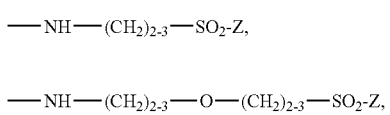 (4c)

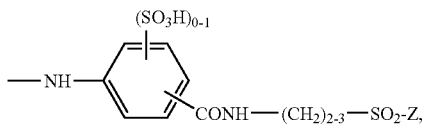 (4d)

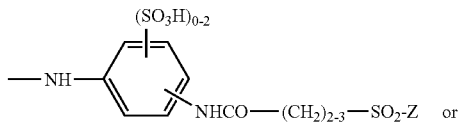 (4e)

or

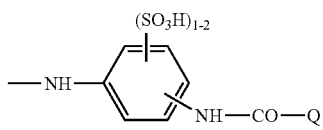 (4f)

wherein
(R$_{10}$)$_{0-2}$ denotes from 0 to 2 identical or different substituents from the group halogen,
C$_1$-C$_4$ alkyl, C$_1$-C$_4$ alkoxy and sulfo,
Z is vinyl or a radical —CH$_2$—CH$_2$—U and U is a group removable under alkaline conditions,
Q is a group —CH(Hal)-CH$_2$-Hal or —C(Hal)=CH$_2$, and
Hal is halogen.

14. A dye radical of formula

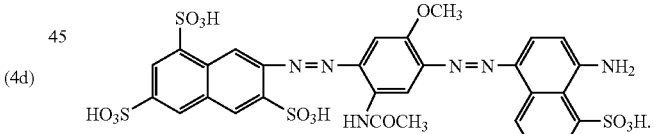

* * * * *

UNITED STATES PATENT AND TRADEMARK OFFICE
CERTIFICATE OF CORRECTION

PATENT NO.       : 7,604,669 B2
APPLICATION NO.  : 12/094429
DATED            : October 20, 2009
INVENTOR(S)      : Jean-Marie Sire et al.

Page 1 of 2

It is certified that error appears in the above-identified patent and that said Letters Patent is hereby corrected as shown below:

Title Page, below item [57], the formula for formula (2) should appear as follows:

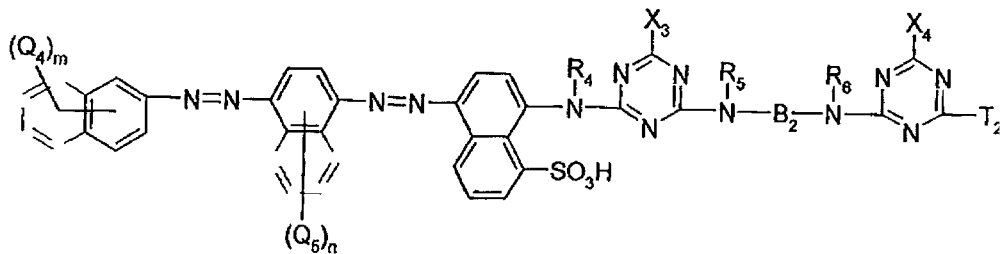

Column 2, lines 30 to 45, the formula for formula (2) should appear as follows:

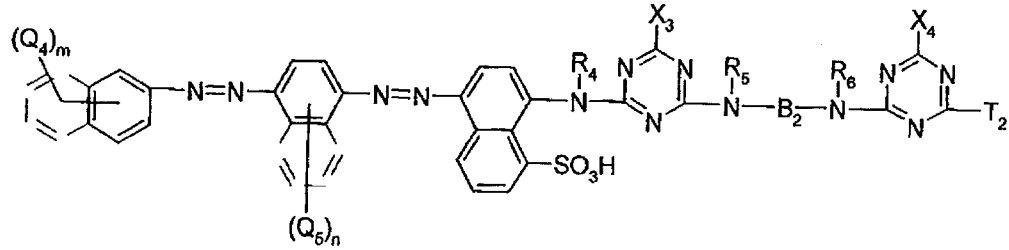

Column 32, lines 32-47 claim 1, the formula for formula (2) should appear as follows:

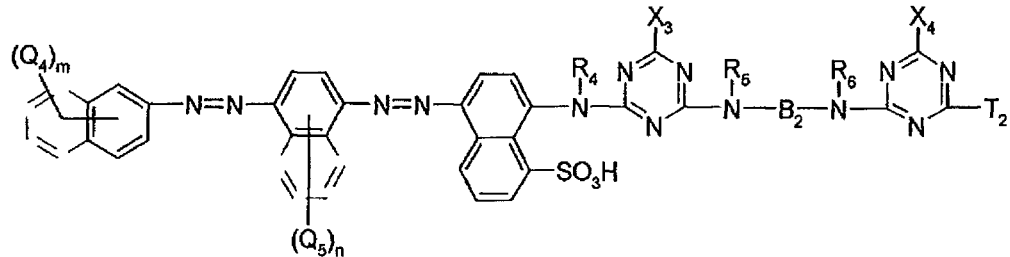

Signed and Sealed this
First Day of May, 2012

David J. Kappos
*Director of the United States Patent and Trademark Office*

CERTIFICATE OF CORRECTION (continued)
U.S. Pat. No. 7,604,669 B2

Columns 37 and 38, lines 6 to 15 claim 10, the formula for formula (2) should appear as follows: